(12) United States Patent
Shoemake et al.

(10) Patent No.: US 9,109,311 B2
(45) Date of Patent: Aug. 18, 2015

(54) TWO PHASE BINDER COMPOSITIONS AND METHODS FOR MAKING AND USING SAME

(75) Inventors: Kelly A. Shoemake, Atlanta, GA (US); Robert A. Breyer, Atlanta, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 652 days.

(21) Appl. No.: 13/412,208

(22) Filed: Mar. 5, 2012

(65) Prior Publication Data

US 2012/0232213 A1 Sep. 13, 2012

Related U.S. Application Data

(60) Provisional application No. 61/450,737, filed on Mar. 9, 2011.

(51) Int. Cl.

| | | |
|---|---|---|
| *D04H 1/4366* | (2012.01) | |
| *D04H 1/4218* | (2012.01) | |
| *C08L 61/06* | (2006.01) | |
| *C08L 61/12* | (2006.01) | |
| *C08L 61/24* | (2006.01) | |
| *C08L 61/28* | (2006.01) | |
| *D04H 1/64* | (2012.01) | |
| *C08L 61/32* | (2006.01) | |
| *B29B 15/12* | (2006.01) | |
| *C08L 35/00* | (2006.01) | |
| *C08K 7/14* | (2006.01) | |
| *C08L 33/00* | (2006.01) | |
| *C08L 61/14* | (2006.01) | |
| *B29B 15/10* | (2006.01) | |
| *D04H 1/593* | (2012.01) | |

(52) U.S. Cl.
CPC .............. *D04H 1/4218* (2013.01); *B29B 15/10* (2013.01); *C08L 61/06* (2013.01); *C08L 61/12* (2013.01); *C08L 61/24* (2013.01); *C08L 61/28* (2013.01); *D04H 1/64* (2013.01); *B29B 15/105* (2013.01); *B29B 15/122* (2013.01); *B29B 15/125* (2013.01); *B29B 15/127* (2013.01); *C08K 7/14* (2013.01); *C08L 33/00* (2013.01); *C08L 35/00* (2013.01); *C08L 61/14* (2013.01); *C08L 61/32* (2013.01); *C08L 2205/02* (2013.01); *C08L 2205/025* (2013.01); *C08L 2205/22* (2013.01); *D04H 1/593* (2013.01); *D04H 1/641* (2013.01)

(58) Field of Classification Search
CPC ......... C08L 35/00; C08L 35/06; C08L 33/00; C08L 61/12; C08L 61/14; C08L 61/32; C08L 61/24; C08L 61/28; C08K 7/14; B29B 15/22; B29B 15/125; B29B 15/127; D04H 1/4218; D04H 1/593; D04H 1/641

USPC .................. 264/136, 137; 524/877, 847, 596; 525/934, 534, 451, 539
See application file for complete search history.

(56) References Cited

U.S. PATENT DOCUMENTS

| | | | |
|---|---|---|---|
| 2,385,372 A | 9/1945 | Rhodes | |
| 2,488,495 A | 11/1949 | Malashevitz | |
| 2,489,336 A | 11/1949 | Spahr et al. | |
| 3,311,594 A | 3/1967 | Earle, Jr. | |
| 3,442,754 A | 5/1969 | Espy | |
| 3,476,706 A | 11/1969 | Bornstein | |
| 3,700,623 A | 10/1972 | Keim | |
| 3,772,076 A | 11/1973 | Keim | |
| 3,839,251 A | 10/1974 | Bornstein | |
| 3,919,151 A | 11/1975 | Moult et al. | |
| 4,032,515 A | 6/1977 | Blommers et al. | |
| 4,314,050 A | 2/1982 | Girgis | |
| 4,373,062 A | 2/1983 | Brown | |
| 4,376,854 A | 3/1983 | Yamaguchi et al. | |
| 4,608,408 A | 8/1986 | Hood et al. | |
| 5,362,842 A | 11/1994 | Graves et al. | |
| 5,389,716 A * | 2/1995 | Graves | 524/510 |
| 5,670,571 A | 9/1997 | Gabrielson et al. | |
| 5,750,597 A * | 5/1998 | Waitkus | 524/35 |
| 5,849,858 A * | 12/1998 | Everett et al. | 528/230 |
| 6,441,122 B1 | 8/2002 | Demott et al. | |
| 6,541,576 B1 | 4/2003 | Phillips et al. | |
| 6,642,299 B2 | 11/2003 | Wertz et al. | |
| 6,906,130 B2 * | 6/2005 | Tutin et al. | 524/596 |
| 7,026,390 B2 | 4/2006 | O'Brien-Bernini et al. | |
| 7,049,387 B2 | 5/2006 | Dupre, Jr. | |
| 7,642,333 B2 | 1/2010 | Qureshi et al. | |
| 8,193,107 B2 | 6/2012 | Tutin et al. | |
| 2004/0192148 A1 | 9/2004 | Kajander | |
| 2007/0292619 A1 * | 12/2007 | Srinivasan et al. | 427/384 |
| 2008/0064284 A1 | 3/2008 | Srinivasan et al. | |
| 2008/0064799 A1 | 3/2008 | Srinivasan et al. | |
| 2008/0280787 A1 | 11/2008 | Rediger et al. | |
| 2009/0124151 A1 * | 5/2009 | Shoemake | 442/180 |
| 2010/0129640 A1 * | 5/2010 | Kelly | 428/323 |
| 2011/0165398 A1 * | 7/2011 | Shoemake et al. | 428/220 |

OTHER PUBLICATIONS

Mottram, Donald et al. "Acrylamide is formed in the Maillard reaction" Oct. 2002, Nature, vol. 419, 448-449.*
International Search Report and Written Opinion of the International Searching Authority for PCT/US2012/027720 mailed Sep. 27, 2012.
Espy, Herbert H.; Alkaline-Curing Polymeric Amine-Epichlorohydrin Resins, Wet Strengths and Their Application, Chapter 2, 1994, pp. 13-44, L. Chan.

* cited by examiner

*Primary Examiner* — Ling Choi
*Assistant Examiner* — David L Miller
(74) *Attorney, Agent, or Firm* — Ram W. Sabnis

(57) ABSTRACT

Fiberglass products and methods for making same are provided. The fiberglass product can include a plurality of fibers and a two phase binder composition comprising a mixture of an aqueous polymer and a powdered polymer.

19 Claims, No Drawings

TWO PHASE BINDER COMPOSITIONS AND METHODS FOR MAKING AND USING SAME

CROSS-REFERENCE TO RELATED APPLICATION

This application claims priority to U.S. Provisional Patent Application No. 61/450,737 filed Mar. 9, 2011, the disclosure of which is incorporated herein in its entirety by this reference.

BACKGROUND

1. Field

Embodiments described herein generally relate to two phase binder compositions. More particularly, such embodiments relate to two phase binder compositions for making fiberglass products.

2. Description of the Related Art

Sheets or mats of non-woven fibers, e.g. glass fibers (fiberglass), are finding increasing application in the building materials industry. Fiberglass mats are typically used in, among other things, insulation materials, flooring products, wall panel products, and roofing products. Fiberglass mats are usually made by a wet-laid process that involves the addition of a binder or adhesive solution to the glass fiber mat to bind and hold the fibers together.

Depending on the particular fiberglass mat and its particular application, different mechanical properties are desirable and/or must be met, such as tear strength, dry tensile strength, and/or wet tensile strength. An important property for a fiberglass mat in roofing material applications, for example, is tear strength. Tear strength provides an estimate as to the ability of the roofing product, such as a shingle incorporating the fiberglass mat, to resist wind forces. As the tear strength of a fiberglass mat increases, the level of wind forces the roofing product can resist also increases, thereby providing a more reliable and durable roofing product. Conventional fiberglass mats that meet the minimum tear strength specifications required for roofing applications are difficult to manufacture, require expensive binder compositions, large amounts of binder, stringent manufacturing processes, and the like.

There is a need, therefore, for improved binder compositions for making fiberglass products.

SUMMARY

Fiberglass products and methods for making same are provided. The fiberglass product can include a plurality of fibers and a two phase binder composition comprising a mixture of an aqueous polymer and a powdered polymer.

The method for preparing a fiberglass product can include contacting a plurality of fibers with a two phase binder composition. The binder composition can include a mixture of an aqueous polymer and a powdered polymer. The contacted fibers can be collected to form a non-woven mat. The non-woven mat can be heated to at least partially cure the binder composition.

DETAILED DESCRIPTION

The two phase binder composition can be or include a mixture of at least one aqueous polymer and at least one powdered polymer. The polymer(s) in the aqueous polymer and the powdered polymer can be the same or different. It has been surprisingly and unexpectedly discovered that the powdered polymer does not dissolve in the aqueous polymer, but rather remains dispersed or suspended in the aqueous polymer. As such, the two phase binder composition comprising a powdered polymer and liquid polymer can be prepared. The two phase binder composition can be shipped and/or stored as a dispersion in the same way other binders, such as aqueous phenol-formaldehyde or aqueous urea-formaldehyde polymers have previously been stored and shipped. Being able to handle and process the two phase binder composition in this way was quite surprising because it was thought that the powdered polymer would, at a minimum, experience sufficient dissolution or softening at the surface of the powdered polymer particles in the environment of the aqueous polymer to promote the sticking or clumping together of the powdered polymer particles with the result that such agglomerates would eventually experience undesired settling. Fortunately, that does not occur, and the powdered polymer particles remain in suspension, easily dispersed in the aqueous polymer.

While not wishing to be bound by theory, it is believed that during the formation of the powered polymer particles, such as by spray drying an aqueous precursor polymer, sufficient drying accompanied by polymer advancement, e.g., B-staging of the polymer, occurs at least on the surface of the particles to insulate the particles from the effect of the aqueous polymer environment. The substantially or essentially moisture free surface of the powered polymer particles can be characterized as a "case hardened surface." Such term means that the surface and at least a shallow depth of the particles have been heated to an extent that such area is substantially or essentially moisture free and consists of higher molecular weight polymer species. This case hardened region thus serves as a seal to prevent, at least for the time needed to prepare and use the binder composition, the aqueous polymer environment from dissolving, partly or completely, the powdered polymer. In addition, the specific gravity of individual spray-dried particles tends to be the same, if not lower than the specific gravity of the aqueous polymer used in binder composition formulations. Accordingly, the powdered polymer has been observed to readily remain dispersed in the aqueous polymer.

The aqueous polymer and the powdered polymer can be or include, but are not limited to, aldehyde containing or aldehyde based polymers, a mixture of Maillard reactants and/or a reaction product of the Maillard reactants, a copolymer of one or more vinyl aromatic derived units and at least one of maleic anhydride and maleic acid, a polyamide-epichlorhydrin polymer, an adduct or polymer of styrene, at least one of maleic anhydride and maleic acid, and at least one of an acrylic acid and an acrylate, a polyacrylic acid based binder, or any combination thereof.

Illustrative aldehyde containing or aldehyde based polymers can include, but are not limited to, urea-aldehyde polymers, melamine-aldehyde polymers, phenol-aldehyde polymers, or combinations thereof. Combinations of aldehyde based polymers can include, for example, melamine-urea-aldehyde, phenol-urea-aldehyde, and phenol-melamine-aldehyde.

The aldehyde component of the aldehyde-containing polymers, e.g., urea-aldehyde polymers, melamine-aldehyde polymers, and/or phenol-aldehyde polymers can include any suitable aldehyde or combination of aldehydes. The aldehyde component can include a variety of substituted and unsubstituted aldehyde compounds. Illustrative aldehyde compounds can include the so-called masked aldehydes or aldehyde equivalents, such as acetals or hemiacetals. Specific examples of suitable aldehyde compounds can include, but are not limited to, formaldehyde, acetaldehyde, propionaldehyde, butyraldehyde, furfuraldehyde, benzaldehyde, or any combination thereof. As used herein, the term "formaldehyde" can refer to formaldehyde, formaldehyde derivatives, other aldehydes, or combinations thereof. Preferably, the aldehyde component is formaldehyde.

Formaldehyde for making suitable formaldehyde containing polymers is available in many forms. Paraform (solid, polymerized formaldehyde) and formalin solutions (aqueous solutions of formaldehyde, sometimes with methanol, in 37%, 44%, or 50% formaldehyde concentrations) are commonly used forms. Formaldehyde gas is also available. Any of these forms is suitable for use in preparing a formaldehyde containing polymer.

The urea component of a urea-aldehyde polymer can be provided in many forms. For example, solid urea, such as prill, and/or urea solutions, typically aqueous solutions, are commonly available. Further, the urea component can be combined with another moiety, for example, formaldehyde and/or urea-formaldehyde adducts, often in aqueous solution. Any form of urea or urea in combination with formaldehyde can be used to make a urea-formaldehyde polymer. Both urea prill and combined urea-formaldehyde products can be used. Suitable urea-formaldehyde polymers can be prepared from urea and formaldehyde monomers or from urea-formaldehyde precondensates in manners well known to those skilled in the art. Illustrative urea-formaldehyde products can include, but are not limited to, Urea-Formaldehyde Concentrate (UFC). These types of products can be as discussed and described in U.S. Pat. Nos. 5,362,842 and 5,389,716, for example. Any of these forms of urea, alone or in any combination, can be used to prepare a urea-aldehyde polymer.

Urea-formaldehyde polymers can include from about 45% to about 70%, and preferably, from about 55% to about 65% non-volatiles, generally have a viscosity of about 50 centipoise (cP) to about 600 cP, preferably about 150 cP to about 400 cP. Urea-formaldehyde polymerx can have a pH of about 6 to about 9 or about 7 to about 9, or preferably about 7.5 to about 8.5. Urea-formaldehyde polymers can have a free formaldehyde level of less than about 5%, less than about 4%, or less than about 3.0%. Urea-formaldehyde polymers can also have a water dilutability of about 1:1 to about 100:1, preferably about 5:1 and above. Many suitable urea-formaldehyde polymers are commercially available. Urea-formaldehyde polymers such as the types sold by Georgia Pacific Chemicals LLC (e.g. GP® 2928 and GP® 2980) for glass fiber mat applications, those sold by Hexion Specialty Chemicals, and by Arclin Company can be used.

In preparing a urea-aldehyde polymer, the formaldehyde and the urea component can be reacted in an aqueous mixture under alkaline conditions using known techniques and equipment. The urea-aldehyde polymer can be made using a molar excess of formaldehyde (along with any other reactive aldehyde component(s)) relative to the urea component, e.g., melamine. The molar ratio of formaldehyde to urea (F:U) in the urea-formaldehyde polymer can range from about 1.1:1 to about 6:1, from about 1.3 to about 5:1, or from about 1.5:1 to about 4:1. When synthesized, such polymers typically contain a low level of residual "free" urea component and a much larger amount of residual "free," i.e. unreacted formaldehyde. Prior to any formaldehyde scavenging, the urea-formaldehyde polymer can be characterized by a free formaldehyde content ranging from about 0.2 wt % to about 18 wt % of the aqueous urea-formaldehyde resin.

The phenol component of a phenol-aldehyde polymer can include a variety of substituted phenolic compounds, unsubstituted phenolic compounds, or any combination of substituted and/or unsubstituted phenolic compounds. For example, the phenol component can be phenol itself (i.e. mono-hydroxy benzene). Examples of substituted phenols can include, but are not limited to, alkyl-substituted phenols such as the cresols and xylenols; cycloalkyl-substituted phenols such as cyclohexyl phenol; alkenyl-substituted phenols; aryl-substituted phenols such as p-phenyl phenol; alkoxy-substituted phenols such as 3,5-dimethyoxyphenol; aryloxy phenols such as p-phenoxy phenol; and halogen-substituted phenols such as p-chlorophenol. Dihydric phenols such as catechol, resorcinol, hydroquinone, bis-phenol A and bis-phenol F also can also be used.

Specific examples of suitable phenolic compounds (phenol components) for replacing a portion or all of the phenol used in preparing a phenol-aldehyde polymer can include, but are not limited to, bis-phenol A, bis-phenol F, o-cresol, m-cresol, p-cresol, 3,5-5 xylenol, 3,4-xylenol, 3,4,5-trimethylphenol, 3-ethyl phenol, 3,5-diethyl phenol, p-butyl phenol, 3,5-dibutyl phenol, p-amyl phenol, p-cyclohexyl phenol, p-octyl phenol, 3,5 dicyclohexyl phenol, p-phenyl phenol, p-phenol, 3,5-dimethoxy phenol, 3,4,5 trimethoxy phenol, p-ethoxy phenol, p-butoxy phenol, 3-methyl-4-methoxy phenol, p-phenoxy phenol, naphthol, anthranol and substituted derivatives thereof. Preferably, about 80 wt % or more, about 90 wt % or more, or about 95 wt % or more of the phenol component comprises phenol (monohydroxybenzene).

In preparing a phenol-aldehyde polymer, the formaldehyde and the phenol component can be reacted in an aqueous mixture under alkaline conditions using known techniques and equipment. The phenol-aldehyde polymer can be made using a molar excess of formaldehyde (along with any other reactive aldehyde component(s)) relative to the phenol component, e.g., phenol. The molar ratio of formaldehyde to phenol (F:P) in the phenol-formaldehyde polymer can range from about 1.1:1 to about 6:1, from about 1.3 to about 5:1, or from about 1.5:1 to about 4:1. When synthesized, such polymers typically contain a low level of residual "free" phenol component and a much larger amount of residual "free," i.e. unreacted formaldehyde. Prior to any formaldehyde scavenging, the phenol-formaldehyde polymer can be characterized by a free formaldehyde content ranging from about 0.2 wt % to about 18 wt % of the aqueous phenol-formaldehyde polymer.

Suitable phenol-formaldehyde polymers can be as discussed and described in U.S. Patent Application Publication Nos. 2008/0064799 and 2008/0064284. In these published patent applications, the formation of tetradimer is suppressed by the addition of a sulfite source during the preparation of the phenol-formaldehyde polymer. Other phenol-formaldehyde resins can be prepared under acidic reaction conditions, such as novolac resins and inverted novolac resins. Suitable novolac resins and inverted novolac resins can be as discussed and described in U.S. Pat. Nos. 5,670,571 and 6,906,130, and U.S. Patent Application Publication No. 2008/0280787.

The melamine component of a melamine-aldehyde polymer can be provided in many forms. For example, solid melamine, such as prill, and/or melamine solutions can be used. Although melamine is specifically mentioned, the melamine can be totally or partially replaced with other aminotriazine compounds. Other suitable aminotriazine compounds can include substituted melamines, or cycloaliphatic guanamines, or mixtures thereof. Substituted melamines include the alkyl melamines and aryl melamines which can be mono-, di-, or tri-substituted. In the alkyl substituted melamines, each alkyl group can contain 1-6 carbon atoms and, preferably 1-4 carbon atoms. Typical examples of some of the alkyl-substituted melamines are monomethyl melamine, dimethyl melamine, trimethyl melamine, monoethyl melamine, and 1-methyl-3-propyl-5-butyl melamine. In the aryl-substituted melamines, each aryl group can contain 1-2 phenyl radicals and, preferably, 1 phenyl radical. Typical examples of an aryl-substituted melamines are monophenyl melamine and diphenyl melamines.

In preparing a melamine-aldehyde polymer, the formaldehyde and the melamine component can be reacted in an aqueous mixture under alkaline conditions using known techniques and equipment. The melamine-aldehyde polymer can be made using a molar excess of formaldehyde (along with any other reactive aldehyde component(s)) relative to the melamine component, e.g., melamine. The molar ratio of formaldehyde to melamine (F:M) in the melamine-formaldehyde polymer can range from about 1.1:1 to about 6:1, from about 1.3 to about 5:1, or from about 1.5:1 to about 4:1. When synthesized, such polymers typically contain a low level of residual "free" melamine component and a much larger amount of residual "free," i.e. unreacted formaldehyde. Prior to any formaldehyde scavenging, the melamine-formaldehyde polymer can be characterized by a free formaldehyde content ranging from about 0.2 wt % to about 18 wt % of the aqueous melamine-formaldehyde resin.

Similar to urea-formaldehyde polymers, melamine-formaldehyde and phenol-formaldehyde polymers can be prepared from melamine or phenol monomers and formaldehyde monomers or from melamine-formaldehyde or phenol-formaldehyde precondensates. Phenol and melamine reactants, like the urea and formaldehyde reactants are commercially available in many forms and any form that can react with the other reactants and does not introduce extraneous moieties deleterious to the desired reaction and reaction product can be used in the preparation of the polymers. Suitable phenol-formaldehyde resins and melamine-formaldehyde resins can include those sold by Georgia Pacific Chemicals LLC (e.g. GP® 2894 and GP® 4878, respectively). These polymers are prepared in accordance with well known methods and contain reactive methylol groups which upon curing form methylene or ether linkages. Such methylol-containing adducts may include N,N'-dimethylol, dihydroxymethylolethylene; N,N' bis(methoxymethyl), N,N'-dimethylolpropylene; 5,5-dimethyl-N,N' dimethylolethylene; N,N'-dimethylolethylene; and the like.

The aqueous polymer and/or the powdered polymer can be or include one or more resorcinol containing polymers. Illustrative resorcinol containing polymers can include, but are not limited to resorcinol-aldehyde polymers, such as resorcinol-formaldehyde, phenol-resorcinol-aldehyde polymers, such as phenol-formaldehyde-resorcinol polymers, resorcinol terminated urea-formaldehyde polymers, and the like, or any combination. An illustrative resorcinol-formaldehyde polymer can include formaldehyde-starved novolac resorcinol-formaldehyde polymers that have excess free resorcinol, i.e. a concentration of free resorcinol that exceeds the concentration of free formaldehyde, and thus contribute free resorcinol to the reaction of the A-stage resin. Suitable resorcinol resins include GP® 4221, a resorcinol/formaldehyde resin having an excess free resorcinol, available from Georgia-Pacific Chemicals LLC. Any suitable form of resorcinol can be used. For example, the resorcinol can be in the form of resorcinol solids, in aqueous or organic solutions, or any combination thereof. For resorcinol-aldehyde polymers, when the aldehyde in the polymer is formaldehyde, the molar ratio of resorcinol to formaldehyde can range from about 0.6:1 to about 2:1 or about 1:1 to about 1.5:1. The amount of resorcinol can range from about 0.1 wt % to about 10 wt %, based on the amount of formaldehyde.

The resorcinol containing polymers can be combined with one or more modifiers to produce a modified resorcinol containing polymer. Illustrative modifiers that can be used to produce a modified resorcinol containing polymer can include, but are not limited to, latexes, styrene maleic anhydride, or a combination thereof. Illustrative latexes can include, but are not limited to, vinylpyridine-styrene butadiene copolymers, polybutadiene dispersions, styrene-butadiene latexes, natural rubber latex, or any combination thereof. Illustrative processes for producing resorcinol containing polymers are discussed and described in U.S. Pat. Nos. 2,385, 372; 2,488,495; 2,489,336; 3,476,706; 3,839,251; 3,919,151; 4,032,515; 4,314,050; 4,373,062; 4,376,854; 4,608,408; and 6,541,576, 7,049,387; and 7,642,333.

The aqueous polymer and/or the powdered polymer can be or include a mixture of Maillard reactants and/or the reacted produce of the mixture of Maillard reactants. The mixture of Maillard reactants can include, but is not limited to, a source of a carbohydrate (carbohydrate reactant) and an amine reactant capable of participating in a Maillard reaction with the carbohydrate reactant. In another example, the mixture of Maillard reactants can include a partially pre-reacted mixture of the carbohydrate reactant and the amine reactant. The extent of any pre-reaction can preserve the ability of the mixture of Maillard reactants to be blended with the dedusting agent and with any other components desired to be added into composition.

The source of the carbohydrate can include one or more reactants having one or more reducing sugars, one or more reactants that yields one or more reducing sugars under thermal curing conditions, or a combination thereof. A reducing sugar can be a sugar that contains aldehyde groups, or can isomerize, i.e. tautomerize, to contain aldehyde groups. Such aldehyde groups are reactive with an amino group (amine reactant) under Maillard reaction conditions. Usually such aldehyde groups can also be oxidized with, for example, $Cu^{+2}$ to afford carboxylic acids. The carbohydrate reactant can optionally be substituted with other functional groups, such as with hydroxy, halo, alkyl, alkoxy, and the like. The carbohydrate source can also possess one or more chiral centers. The carbohydrate source can also include each possible optical isomer at each chiral center. Various mixtures, including racemic mixtures, or other diastereomeric mixtures of the various optical isomers of any such carbohydrate source, as well as various geometric isomers thereof, can be used.

The carbohydrate source can be nonvolatile. Nonvolatile carbohydrate sources can increase or maximize the ability of the carbohydrate reactant to remain available for reaction with the amine reactant under Maillard reaction conditions, including the curing conditions for curing the composition. Partially pre-reacting the mixture of the source of the carbohydrate and the amine reactant can expand the list of suitable carbohydrate sources. The carbohydrate source can be a monosaccharide in its aldose or ketose form, including a triose, a tetrose, a pentose, a hexose, or a heptose; or a polysaccharide, or any combination thereof.

If a triose serves as the carbohydrate source, or is used in combination with other reducing sugars and/or a polysaccharide, an aldotriose sugar or a ketotriose sugar can be utilized, such as glyceraldehyde and dihydroxyacetone, respectively. If a tetrose serves as the carbohydrate source, or is used in combination with other reducing sugars and/or a polysaccharide, aldotetrose sugars, such as erythrose and threose; and ketotetrose sugars, such as erythrulose, can be utilized. If a pentose serves as the carbohydrate source, or is used in combination with other reducing sugars and/or a polysaccharide, aldopentose sugars, such as ribose, arabinose, xylose, and lyxose; and ketopentose sugars, such as ribulose, arabulose, xylulose, and lyxulose, can be utilized. If a hexose serves as the carbohydrate source, or is used in combination with other reducing sugars and/or a polysaccharide, aldohexose sugars, such as glucose (i.e. dextrose), mannose, galactose, allose, altrose, talose, gulose, and idose; and ketohexose sugars, such as fructose, psicose, sorbose and tagatose, can be utilized. If a heptose serves as the carbohydrate source, or is used in combination with other reducing sugars and/or a polysaccharide, a ketoheptose sugar such as sedoheptulose can be utilized. Other stereoisomers of such carbohydrate sources not known to occur naturally are also contemplated to be useful in preparing the compositions. If a polysaccharide serves as the carbohydrate source, or is used in combination with monosaccharides, then sucrose, lactose, maltose, starch, and cellulose can be utilized.

The carbohydrate reactant can also be used in combination with a non-carbohydrate polyhydroxy reactant. Examples of non-carbohydrate polyhydroxy reactants can include, but are not limited to, trimethylolpropane, glycerol, pentaerythritol, polyvinyl alcohol, partially hydrolyzed polyvinyl acetate, fully hydrolyzed polyvinyl acetate, and mixtures thereof. The non-carbohydrate polyhydroxy reactant can be sufficiently nonvolatile to maximize its ability to remain available for reaction with other components during curing. Partially pre-reacting the mixture of the source of the carbohydrate (carbohydrate reactant) and the amine reactant can expand the list of suitable non-carbohydrate polyhydroxy reactants. The hydrophobicity of the non-carbohydrate polyhydroxy reactant can be a factor in determining the physical properties of the composition.

The amine reactant capable of participating in a Maillard reaction with the source of the carbohydrate can be a compound possessing an amino group. The compound can be present in the form of an amino acid. The free amino group can also be derived from a protein where the free amino groups are available in the form of, for example, the e-amino group of lysine residues, and/or the α-amino group of the terminal amino acid. The amine reactant can also be formed separately or in situ by using a polycarboxylic acid ammonium salt reactant. Ammonium salts of polycarboxylic acids can be generated by neutralizing the acid groups of a polycarboxylic acid with an amine base, thereby producing polycarboxylic acid ammonium salt groups. Complete neutralization, i.e. about 100%, calculated on an equivalents basis, can eliminate any need to titrate or partially neutralize acid groups in the polycarboxylic acid(s) prior to binder formation. However, it is expected that less-than-complete neutralization also would not inhibit formation of the composition. To reiterate, neutralization of the acid groups of the polycarboxylic acid(s) can be carried out either before or after the polycarboxylic acid(s) is mixed with the carbohydrate(s).

Suitable polycarboxylic acids can include dicarboxylic acids, tricarboxylic acids, tetracarboxylic acids, pentacarboxylic acids, and the like, monomeric polycarboxylic acids, anhydrides, and any combination thereof, as well as polymeric polycarboxylic acids, anhydrides, and any combination thereof. Preferably, the polycarboxylic acid ammonium salt reactant is sufficiently non-volatile to maximize its ability to remain available for reaction with the carbohydrate reactant of a Maillard reaction. Again, partially pre-reacting the mixture of the source of the carbohydrate and the amine reactant can expand the list of suitable amine reactants, including polycarboxylic acid ammonium salt reactants. In another example, polycarboxylic acid ammonium salt reactants can be substituted with other chemical functional groups.

Illustrative monomeric polycarboxylic acids can include, but are not limited to, unsaturated aliphatic dicarboxylic acids, saturated aliphatic dicarboxylic acids, aromatic dicarboxylic acids, unsaturated cyclic dicarboxylic acids, saturated cyclic dicarboxylic acids, hydroxy-substituted derivatives thereof, and the like. Other suitable polycarboxylic acids can include unsaturated aliphatic tricarboxylic acids, saturated aliphatic tricarboxylic acids such as citric acid, aromatic tricarboxylic acids, unsaturated cyclic tricarboxylic acids, saturated cyclic tricarboxylic acids, hydroxy-substituted derivatives thereof, and the like. It is appreciated that any such polycarboxylic acids can be optionally substituted, such as with hydroxy, halo, alkyl, alkoxy, and the like. Other suitable polycarboxylic acids can include, but are not limited to, aconitic acid, adipic acid, azelaic acid, butane tetracarboxylic acid dihydride, butane tricarboxylic acid, chlorendic acid, citraconic acid, dicyclopentadiene-maleic acid adducts, diethylenetriamine pentaacetic acid, adducts of dipentene and maleic acid, ethylenediamine tetraacetic acid (EDTA), fully maleated rosin, maleated tall-oil fatty acids, fumaric acid, glutaric acid, isophthalic acid, itaconic acid, maleated rosin oxidized with potassium peroxide to alcohol then carboxylic acid, maleic acid, malic acid, mesaconic acid, biphenol A or bisphenol F reacted via the Kolbe-Schmidt reaction with carbon dioxide to introduce 3-4 carboxyl groups, oxalic acid, phthalic acid, sebacic acid, succinic acid, tartaric acid, terephthalic acid, tetrabromophthalic acid, tetrachlorophthalic acid, tetrahydrophthalic acid, trimellitic acid, trimesic acid, and the like, and anhydrides, and any combination thereof.

Suitable polymeric polycarboxylic acids can include organic polymers or oligomers containing more than one pendant carboxy group. The polymeric polycarboxylic acid can be a homopolymer or copolymer prepared from unsaturated carboxylic acids that can include, but are not limited to, acrylic acid, methacrylic acid, crotonic acid, isocrotonic acid, maleic acid, cinnamic acid, 2-methylmaleic acid, itaconic acid, 2-methylitaconic acid, α,β-methyleneglutaric acid, and the like. The polymeric polycarboxylic acid can also be prepared from unsaturated anhydrides. Unsaturated anhydrides can include, but are not limited to, maleic anhydride, itaconic anhydride, acrylic anhydride, methacrylic anhydride, and the like, as well as mixtures thereof. Methods for polymerizing these acids and anhydrides are well-known in the chemical art.

Preferred polymeric polycarboxylic acids can include polyacrylic acid, polymethacrylic acid, polymaleic acid, and the like. Examples of commercially available polyacrylic acids include AQUASET® 529 (Rohm & Haas, Philadelphia, Pa., USA), CRITERION® 2000 (Kemira, Helsinki, Finland, Europe), NF1 (H. B. Fuller, St. Paul, Minn., USA), and SOKALAN® (BASF, Ludwigshafen, Germany, Europe). With respect to SOKALAN®, this is believed to be a water-soluble polyacrylic copolymer of acrylic acid and maleic acid, having a molecular weight of approximately 4,000. AQUASET® 529 is understood to be a composition containing polyacrylic acid cross-linked with glycerol, also containing sodium hypophosphite as a catalyst. CRITERION® 2000 is thought to be an acidic solution of a partial salt of polyacrylic acid, having a molecular weight of approximately 2,000. NF1 is believed to be a copolymer containing carboxylic acid functionality and hydroxy functionality, as well as units with neither functionality; NF1 is also thought to contain chain transfer agents, such as sodium hypophosphite or organophosphate catalysts.

The amine base for reaction with the polycarboxylic acid can include, but is not limited to, ammonia, a primary amine, i.e. $NH_2R^1$, and a secondary amine, i.e. $NHR^1R^2$, where $R^1$ and $R^2$ are each independently selected from the group consisting of: an alkyl, a cycloalkyl, an alkenyl, a cycloalkenyl, a heterocyclyl, an aryl, and a heteroaryl group. The amine base can be volatile or substantially non-volatile under conditions sufficient to promote reaction among the mixture of Maillard reactants during any partial pre-reaction or during thermal cure of the composition. Suitable amine bases can include, but are not limited to, a substantially volatile base, a substantially non-volatile base, or a combination thereof. Illustrative substantially volatile bases can include, but are not limited to, ammonia, ethylamine, diethylamine, dimethylamine, ethylpropylamine, or any combination thereof. Illustrative substantially non-volatile bases can include, but are not limited to, aniline, 1-naphthylamine, 2-naphthylamine, para-aminophenol, or any combination thereof.

One particular example of the mixture of Maillard reactants can include a mixture of aqueous ammonia, citric acid, and dextrose (glucose). It is believed that the mixture of aqueous ammonia, citric acid, and dextrose is representative of Knauf Insulation's ECOSE® Technology. In this mixture, the ratio of the number of molar equivalents of acid salt groups present on the polycarboxylic, citric acid reactant (produced upon neutralization of the —COOH groups of the citric acid by ammonia) to the number of molar equivalents of hydroxyl groups present on the carbohydrate reactant(s) can range from about 0.04:1 to about 0.15:1. After curing, this formulation results in a water-resistant, cured thermoset binder. Thus, in one embodiment, the number of molar equivalents of hydroxyl groups present on the dextrose, carbohydrate reactant can be about twenty five-fold greater than the number of molar equivalents of acid salt groups present on the polycarboxylic, citric acid reactant. In another embodiment, the number of molar equivalents of hydroxyl groups present on the dextrose carbohydrate reactant is about ten-fold greater than the number of molar equivalents of acid salt groups present on the polycarboxylic citric acid reactant. In yet another embodiment, the number of molar equivalents of hydroxyl groups present on the dextrose carbohydrate reactant is about six-fold greater than the number of molar equivalents of acid salt groups present on the polycarboxylic citric acid reactant.

As noted above, the mixture of Maillard reactants can include a source of a carbohydrate and an amine reactant capable of participating in a Maillard reaction therewith. Also, as noted above, the mixture of Maillard reactants can include a partially reacted mixture of a source of a carbohydrate and an amine reactant. For example, the source of a carbohydrate can be mixed with an amine reactant capable of participating in a Maillard reaction with the source of the carbohydrate and the mixture can be heated to about 90° C. for a time sufficient to initiate the Maillard reaction(s), but not allow the reaction(s) to proceed to completion, before finally formulating the composition.

As the case with the aldehyde based polymers, a binder that includes a mixture of Maillard reactants can also include other ingredients commonly used in such compositions such as an extender, e.g., urea, one or more catalysts for accelerating the cure of the resin such as sodium or ammonium sulfate, melamine, melamine-formaldehyde adducts, silicon-based coupling or compatibilizing agents, corrosion inhibitors, dispersants, biocides, viscosity modifiers, pH adjusters, surfactants, lubricants, defoamers, and the like, and any combination thereof.

In at least one specific embodiment, the aldehyde based binder(s) and/or the Maillard reactant based binder can be modified by combining with one or more modifiers. The modifier can be or include the copolymer comprising one or more vinyl aromatic derived units and at least one of maleic anhydride and maleic acid. In another example, the modifier can be or include an adduct of styrene, at least one of maleic anhydride and maleic acid, and at least one of an acrylic acid and an acrylate. In another example, the modifier can be or include the one or more latexes. In another example, the modifier can include two or more of: (1) a copolymer comprising one or more vinyl aromatic derived units and at least one of maleic anhydride and maleic acid; (2) an adduct of styrene, at least one of maleic anhydride and maleic acid, and at least one of an acrylic acid and an acrylate; and (3) one or more latexes. The addition of the one or more modifiers to the aldehyde based binder and/or the Maillard reactant based binder can be as discussed and described in U.S. patent application Ser. No. 12/860,446, filed on Aug. 20, 2010.

The aqueous polymer and/or the powdered polymer can be or include a copolymer of one or more vinyl aromatic derived units and at least one of maleic anhydride and maleic acid. Illustrative vinyl aromatic derived units can include, but are not limited to, styrene, alpha-methylstyrene, vinyl toluene, and combinations thereof. Preferably, the vinyl aromatic derived units are derived from styrene and/or derivatives thereof. More preferably, the vinyl aromatic derived units are derived from styrene to produce a styrene maleic anhydride (acid) or "SMA" copolymer. Suitable SMA copolymers include resins that contain alternating styrenic and maleic anhydride (acid) monomer units, arranged in random, alternating, and/or block forms.

In one or more embodiments, the copolymer of the one or more vinyl aromatic derived units and at least one of maleic anhydride and maleic acid can include from about 7 mol % to about 50 mol % maleic anhydride (acid) and conversely from about 50 mol % to about 93 mol % vinyl aromatic derived units. In one or more embodiments, the copolymer of the one or more vinyl aromatic derived units and at least one of maleic anhydride and maleic acid can include from about 20 mol % to about 40 mol % maleic anhydride (acid) and conversely of from about 60 mol % to about 80 mol % vinyl aromatic derived units. In one or more embodiments, the maleic anhydride (maleic acid) can be present in an amount ranging from a low of about 7 mol %, about 10 mol %, about 12 mol %, or about 15 mol % to a high of about 30 mol %, about 35 mol %, about 40 mol %, or about 45 mol %, based on the total weight of the maleic anhydride (acid) and the one or more vinyl derived units. In one or more embodiments, the vinyl aromatic derived units can be present in an amount ranging from a low of about 50 mol %, about 55 mol %, about 60 mol %, or about 65 mol % to a high of about 75 mol %, about 80 mol %, about 85 mol %, or about 90 mol %, based the total weight of the maleic anhydride (acid) and the one or more vinyl derived units.

The molecular weight of the copolymer of the one or more vinyl aromatic derived units and at least one of maleic anhydride and maleic acid can vary within wide limits. Preferably, the copolymer of the one or more vinyl aromatic derived units and at least one of maleic anhydride and maleic acid has a weight average molecular weight (Mw) of between about 500 and 500,000. The copolymer can have a Mw ranging from a low of about 500, about 750, about 1,000, about 1,500, about 2,000, about 2,500, about 3,000, or about 4,000 to a high of about 50,000, about 80,000, about 100,000, about 200,000, about 300,000, about 400,000, or about 500,000. In at least one specific embodiment, the copolymer of the one or more vinyl aromatic derived units and at least one of maleic anhydride and maleic acid can have a Mw ranging from about 500 to about 750, about 1,500 to about 3,000, about 5,000 to about 10,000, about 500 to about 10,000, about 500 to about 15,000, or about 1,000 to about 15,000.

The copolymer of the one or more vinyl aromatic derived units and at least one of maleic anhydride and maleic acid can contain a minor amount (less than 50 mol %, or less than about 40 mol %, or less than about 30 mol %, or less than about 20 mol %, based on the amount of maleic anhydride (maleic acid)) of another unsaturated carboxylic acid monomer such as aconitic acid, itaconic acid, acrylic acid, methacrylic acid, crotonic acid, isocrotonic acid, citraconic acid, and fumaric acid and the mixtures thereof. The copolymer of the one or more vinyl aromatic derived units and at least one of maleic anhydride and maleic acid can also contain a minor amount (less than 50 mol %, or less than about 40 mol %, or less than about 30 mol %, or less than about 20 mol %, based on the amount of the vinyl aromatic derived units) of another hydrophobic vinyl monomer. Another "hydrophobic vinyl monomer" is a monomer that typically produces, as a homopolymer, a polymer that is water-insoluble or capable of absorbing less than 10% by weight water. Suitable hydrophobic vinyl monomers are exemplified by (i) vinyl esters of aliphatic acids such as vinyl acetate, vinyl propionate, vinyl butyrate, vinyl caproate, vinyl 2-ethylhexanoate, vinyl laurate, and vinyl stearate; (ii) diene monomers such as butadiene and isoprene; (iii) vinyl monomers and halogenated vinyl monomers such as ethylene, propylene, cyclohexene, vinyl chloride and vinylidene chloride; (iv) acrylates and alkyl acrylates, such as methyl acrylate, ethyl acrylate, n-propyl acrylate, isopropyl acrylate, n-butyl acrylate, isobutyl acrylate, tert-butyl acrylate, n-hexyl acrylate, cyclohexyl acrylate, and 2-ethylhexyl acrylate; and (v) nitrile monomers such as acrylonitrile and methacrylonitrile and mixtures thereof.

In one or more embodiments, the binder comprising the copolymer of maleic anhydride and one or more vinyl aromatic derived units can be modified by reaction with one or more amines Illustrative amines can include, but are not limited to, alkanolamines, polyamines, aromatic amines, and any combination thereof. Illustrative alkanolamines can include, but are not limited to, monoethanolamine (MEA), diethanolamine (DEA), triethanolamine (TEA), or any combination thereof. Preferably, the alkanolamine is a tertiary alkanolamine or more preferably triethanolamine (TEA). An alkanolamine is defined as a compound that has both amino and hydroxyl functional groups as illustrated by diethanolamine, triethanolamine, 2-(2-aminoethoxy)ethanol, aminoethyl ethanolamine, aminobutanol and other aminoalkanols. Illustrative aromatic amines can include, but are not limited to, benzyl amine, aniline, ortho toludine, meta toludine, para toludine, n-methyl aniline, N—N'-dimethyl aniline, di- and tri-phenyl amines, 1-naphthylamine, 2-naphthylamine, 4-aminophenol, 3-aminophenol and 2-aminophenol. Illustrative polyamines can include, but are not limited to, diethylenetriamine (DETA), triethylenetetramine (TETA), tetraethylenepentamine (TEPA). Other polyamines can include, for example, 1,3-propanediamine, 1,4-butanediamine, polyamidoamines, and polyethylenimines.

Other suitable amines can include, but are not limited to, primary amines ($NH_2R_1$), secondary amines ($NHR_1R_2$), and tertiary amines ($NR_1R_2R_3$), where each $R_1$, $R_2$, and $R_3$ can be independently selected from alkyls, cycloalkyls, heterocloalkyls, aryls, heteroaryls, and substituted aryls. The alkyl can include branched or unbranched alkyls having from 1 to 15 carbon atoms or more preferably from 1 to 8 carbon atoms. Illustrative alkyls can include, but are not limited to, methyl, ethyl, n-propyl, isopropyl, n-butyl, sec butyl, t-butyl, n-pentyl, n-hexyl, and ethylhexyl. The cycloalkyls can include from 3 to 7 carbon atoms. Illustrative cycloalkyls can include, but are not limited to, cyclopentyl, substituted cyclopentyl, cyclohexyl, and substituted cyclohexyl. The term "aryl" refers to an aromatic substituent containing a single aromatic ring or multiple aromatic rings that are fused together, linked covalently, or linked to a common group such as a methylene or ethylene moiety. More specific aryl groups contain one aromatic ring or two or three fused or linked aromatic rings, e.g., phenyl, naphthyl, biphenyl, anthracenyl, phenanthrenyl, and the like. In one or more embodiments, aryl substituents can have from 1 to about 20 carbon atoms. The term "heteroatom-containing," as in a "heteroatom-containing cycloalkyl group," refers to a molecule or molecular fragment in which one or more carbon atoms is replaced with an atom other than carbon, e.g., nitrogen, oxygen, sulfur, phosphorus, boron, or silicon. Similarly, the term "heteroaryl" refers to an aryl substituent that is heteroatom-containing. The term "substituted," as in "substituted aryls," refers to a molecule or molecular fragment in which at least one hydrogen atom bound to a carbon atom is replaced with one or more substituents that are functional groups such as hydroxyl, alkoxy, alkylthio, phosphino, amino, halo, silyl, and the like. Illustrative primary amines can include, but are not limited to, methylamine and ethylamine Illustrative secondary amines can include, but are not limited to, dimethylamine and diethylamine Illustrative tertiary amines can include, but are not limited to, trimethylamine and triethylamine.

The addition of one or more carbohydrates to the binder containing the copolymer of maleic anhydride (acid) and one or more vinyl aromatic derived units and/or modifying the binder comprising the copolymer of maleic anhydride and one or more vinyl aromatic derived units can be as discussed and described in U.S. Provisional Patent Application having Ser. No. 61/265,956, filed on Dec. 2, 2009.

The aqueous polymer and/or the powdered polymer can be or include a polyamide-epichlorhydrin polymer. Polyamide-epichlorhydrin polymers can be made by the reaction of epichlorohydrin and a polyamide under basic conditions (i.e. a pH between about 7 to about 11). The resulting polymer can then be contacted with an acid to stabilize the product. See, e.g., U.S. Pat. Nos. 3,311,594 and 3,442,754. Unreacted epichlorohydrin in the product can be hydrolyzed by the acid to 1,3-dichloro-2-propanol (1,3-DCP), 3-chloro-1,2-propanediol (CPD), and 2,3-dichloro-1-propanol (2,3-DCP). The 1,3-DCP product is the predominant hydrolysis product with CPD being formed in levels of about 10% of the 1,3-DCP and 2,3-DCP being formed in levels of about 1% of the 1,3-DCP. Although the final product can include several other types of organic chlorines (as measured by the difference between inorganic chloride and total chlorine concentrations), the 1,3-DCP and CPD concentrations can be accurately determined by $C^{13}$ NMR and GC-MS measuring techniques known in the art. The 2,3-DCP concentrations are, however, generally below the detection limit of $C^{13}$ NMR so 1,3-DCP and CPD are generally used as measurements for the epichlorohydrin hydrolysis products present in the polymer. Of particular utility are the polyamide-epchlorohydrin polymers, an example of which is sold under the trade names Kymene 557LX and Kymene 557H by Hercules, Inc. and AMRES® from Georgia-Pacific Resins, Inc. These polymers and the process for making the polymers are discussed and described in U.S. Pat. Nos. 3,700,623 and 3,772,076. An extensive description of polymeric-epihalohydrin resins is given in Chapter 2: *Alkaline—Curing Polymeric Amine—Epichlorohydrin by Espy in Wet Strength Resins and Their Application* (L. Chan, Editor, 1994).

In one or more embodiments, the adduct or polymer of styrene, at least one of maleic anhydride and maleic acid, and at least one of an acrylic acid and an acrylate. Any suitable acrylic acid or acrylate can be used such as methyl methacrylate, butyl acrylate, methacrylate, or any combination thereof. Preferably, the acrylate is methyl methacrylate (MMA). The adduct can be combined with the aldehyde based polymer, the Maillard reactants, or a combination thereof. In another example, the components of the adduct can be mixed with the aldehyde based polymer, the mixture of Maillard reactants, or a combination thereof.

The adduct can be prepared by dissolving the components of the adduct in a suitable solution. Illustrative solutions can include, but are not limited to, aqueous solutions of sodium hydroxide, ammonium hydroxide, potassium hydroxide, and combinations thereof. The solution can be heated to a temperature of about 70° C. to about 90° C. The solution can be held at the elevated temperature until the components are all at least partially in solution. The solution can then be added to the phenol-aldehyde resin, the mixture of Maillard reactants, or the combination of the phenol-aldehyde resin and the mixture of Maillard reactants.

The adduct can be prepared by combining styrene, at least one of maleic anhydride and maleic acid, and at least one of an acrylic acid and an acrylate to form a terpolymer. The amount of styrene in the adduct can range from a low of about 50 wt %, about 55 wt %, or about 60 wt % to a high of about 75 wt %, about 80 wt %, or about 85 wt %, based on the total weight of the adduct. The amount of the maleic anhydride and/or maleic acid in the adduct can range from a low of about 15 wt %, about 20 wt %, or about 25 wt % to a high of about 40 wt %, about 45 wt %, or about 50 wt %, based on the total weigh of the adduct. The amount of the acrylic acid and/or the acrylate in the adduct can range from a low of about 1 wt %, about 3 wt % or about 5 wt % to a high of about 10 wt %, about 15 wt %, or about 20 wt %, based on the total weight of the adduct.

In another example, the acrylic acid or acrylate can be combined with the copolymer of one or more vinyl aromatic derived units and at least one of maleic anhydride and maleic acid to provide the modifier. For example, combining the acrylic acid or acrylate with SMA can form a styrene maleic anhydride methyl-methacrylate terpolymer. In another example, the modifier can also include a physical mixture of styrene acrylic acid and/or styrene-acrylate copolymer and a SMA copolymer. The adduct or polymer of styrene, at least one of maleic anhydride and maleic acid, and at least one of an acrylic acid and an acrylate and the physical mixture of styrene acrylic acid and/or styrene-acrylate copolymer and a SMA copolymer can be prepared according to the processes discussed and described in U.S. Pat. No. 6,642,299.

The polyacrylic acid based binder can include an aqueous solution of a polycarboxy polymer, a monomeric trihydric alcohol, a catalyst, and a pH adjuster. The polycarboxy polymer can include an organic polymer or oligomer containing more than one pendant carboxy group. The polycarboxy polymer can be a homopolymer or copolymer prepared from unsaturated carboxylic acids including, but not limited to, acrylic acid, methacrylic acid, crotonic acid, isocrotonic acid, maleic acid, cinnamic acid, 2-methylmaleic acid, itaconic acid, 2-methylitaconic acid, α,β-methyleneglutaric acid, and the like. Other suitable polycarboxy polymers can be prepared from unsaturated anhydrides including, but not limited to, maleic anhydride, itaconic anhydride, acrylic anhydride, methacrylic anhydride, and the like, as well as mixtures thereof.

Illustrative trihydric alcohols can include, but are not limited to, glycerol, trimethylolpropane, trimethylolethane, triethanolamine, 1,2,4-butanetriol, and the like. The one or more trihydric alcohols can be mixed with other polyhydric alcohols. Other polyhydric alcohols can include, but are not limited to, ethylene, glycol, 1,3-propanediol, 1,4-butanediol, 1,6-hexanediol, 2-butene-1, erythritol, pentaerythritol, sorbitol, and the like. The catalyst can include an alkali metal salt of a phosphorous-containing organic acid; particularly alkali metal salts of phosphorous acid, hypophosphorous acid, and polyphosphoric acids. Illustrative catalysts can include, but are not limited to, sodium, sodium phosphite, potassium phosphite, disodium pyrophosphate, tetrasodium pyrophosphate, sodium tripolyphosphate, sodium hexametaphosphate, potassium phosphate, potassium polymetaphosphate, potassium polyphosphate, potassium tripolyphosphate, sodium trimetaphosphate, and sodium tetrametaphosphate, or any combination thereof. Illustrative polyacrylic acid based polymers can be as discussed and described in U.S. Pat. No. 7,026,390.

In one or more embodiments, any one of the polymers or combination of polymers can be extended using any suitable material. For example, the polymer(s) can be extended through the addition of urea. In one or more embodiments, the binder can be extended with urea such that the polymer has a urea concentration ranging from about 1 wt % to about 50 wt %, based on the combined weight of the polymer and the added urea. In another example, the polymer extended with urea can have a urea concentration ranging from a low of about 5 wt %, about 15 wt %, or about 25 wt % to a high of about 35 wt %, about 40 wt %, or about 45 wt %, based on the combined weight of the binder and the added urea. In at least one specific embodiment, the aldehyde based binder, the Maillard reactants binder, the copolymer of one or more vinyl aromatic derived units and at least one of maleic anhydride and maleic acid, or any combination thereof, can be extended with urea.

Other suitable extenders can include, but are not limited to, polysaccharides, sulfonated lignins, and the like. Illustrative polysaccharides can be include, but are not limited to, starch, cellulose, gums, such as guar and xanthan, alginates, pectin, gellan, or any combination thereof. Suitable polysaccharide starches can include, for example maize or corn, waxy maize, high amylose maize, potato, tapioca and wheat starch. Other starches such as genetically engineered starches can include, high amylose potato and potato amylopectin starches. Illustrative sulfonated lignins can include, but are not limited to, sodium lignosulfonate and ammonium lignodulfonate.

In one or more embodiments, the optional urea can be added to the polymer by mixing, blending, or any other process to produce a "premix." The premix can be agitated to homogeneity. After forming the premix, the premix can be allowed to react or prereact for a period of time. For example, the premix can be allowed to react for about 5 hours or more, about 10 hours or more, about 15 hours or more, about 20 hours or more, or about 25 hours or more, after which time it can be stored at 65° F. and used to prepare a composition for up to approximately four days. Premixing the urea with aldehyde-based binders, for example, can reduce the level of free aldehydes, such as formaldehyde, in the aldehyde based binder to a level that does not increase the ammonia demand of binder solutions prepared with the premix.

In addition to the specific examples of aldehyde based polymers, such as urea-formaldehyde (UF), phenol-formaldehyde (PF), and melamine-formaldehyde (MF), the mixture of Maillard reactants and/or reaction products of the Maillard reactants, a copolymer of one or more vinyl aromatic derived units and at least one of maleic anhydride and maleic acid, a polyamide-epichlorhydrin polymer, an adduct or polymer of styrene, at least one of maleic anhydride and maleic acid, and at least one of an acrylic acid and an acrylate, a polyacrylic acid based binder, the liquid polymer and/or the powdered polymer can include any combination of these polymers or other polymers. As such, a polymer that includes a mixture of a first polymer and a second polymer can be prepared. Illustrative combinations of polymers can include, but are not limited to, one or more aldehyde based polymers combined with the mixture of Maillard reactants and/or reaction products of the Maillard reactants; one or more aldehyde based polymers combined with a copolymer of one or more vinyl aromatic derived units and at least one of maleic anhydride and maleic acid, e.g. SMA; the mixture of Maillard reactants and/or reaction products of the Maillard reactants combined with a copolymer of one or more vinyl aromatic derived units and at least one of maleic anhydride and maleic acid, e.g. SMA; and the like.

In one or more embodiments, the first polymer can be present in an amount of from about 1 wt % to about 99 wt %, based on the combined weight of the first polymer and the second polymer. For example, the first polymer can be present in an amount ranging from a low of about 5 wt %, about 15 wt %, about 25 wt %, or about 35 wt % to a high of about 65 wt %, about 75 wt %, about 85 wt %, or about 95 wt %, based on the combined weight of the first polymer and the second polymer. When three or more binders are combined to provide the polymer, the three or more polymer can be present in any amount. For example, for a combination of three polymers, the first polymer can be present in an amount of from about 1 wt % to about 98 wt %, the second polymer can be present in an amount of from about 1 wt % to about 98 wt %, and the third polymer can be present in an amount of from about 1 wt % to about 98 wt %, based on the combined weight of the first, second, and third polymers.

The powdered polymer can be prepared using any suitable process or combination of processes. For example, the powdered polymer can be prepared by spray drying, freeze drying, vacuum drying, precipitation, air drying, and/or dry spinning. An aqueous polymer suitable for spray-drying can have an initial solids content ranging from a low of about 10 wt %, about 15 wt %, about 20 wt %, about 25 wt %, or about 30 wt % to a high of about 40 wt %, about 45 wt %, about 50 wt %, about 55 wt %, about 60 wt %, or about 65 wt %, based on the weight of the aqueous polymer. As used herein, the solids content of an aqueous solution of a polymer, as understood by those skilled in the art, can be measured by determining the weight loss upon heating a small sample, e.g., 1-5 grams, of the aqueous polymer at about 105° C. for a time sufficient to remove the water. By measuring the weight of the sample before and after heating, the percent solids in the sample can be directly calculated or otherwise estimated.

Methods for spray-drying, freeze drying, vacuum drying, precipitation, air drying, and dry spinning aqueous polymers to produce a powdered polymer are well known to those skilled in the art and a detailed description of the equipment and process variables are unnecessary. For example, spray drying refers to the process of atomizing (in the form of small droplets) the aqueous polymer into a gas stream (often a heated air stream) under controlled temperature conditions and under specific gas/liquid contacting conditions to effect evaporation of water from the atomized droplets and production of a dry particulate solid product.

In the spray drying process, an aqueous polymer, such as an aqueous urea-aldehyde polymer, as-synthesized or after further dilution, can be atomized to small droplets and mixed with hot air (e.g., air at an inlet temperature usually between about 140° C. and about 250° C.) to evaporate the liquid from the polymer droplets. The temperature of the polymer during the spray-drying process is usually close to or greater than the boiling temperature of the liquid, e.g., the water. An outlet air temperature of between about 60° C. and about 120° C. is common. Due to the curable (thermosetting) character of the polymer, adjusting the operation of the spray-drying process to achieve thorough evaporation of the moisture at the lowest possible inlet and outlet temperatures is generally desired.

Spray drying is typically carried out with pressure nozzles (nozzle atomization—including two fluid nozzles) or centrifugal or rotary atomizers operating at high speeds (e.g., a spinning disc). Despite the high velocity generation of droplets, a spray dryer is designed so that the droplets avoid a much as possible contact with the spray dryer wall under proper operating procedures. This effect is achieved by a precise balance of atomizer velocity, air flow, spray dryer dimensions, e.g., height and diameter, and the design of inlet and outlet means to produce a cyclonic flow of gas, e.g., air in the chamber. A pulse atomizer also can be used to produce the small droplets needed to facilitate evaporation of the water. In some cases, it can be desirable to include a flow promoter, such as calcium stearate and/or an aluminosilicate material, in the aqueous dispersion that is processed in a spray dryer simply to facilitate subsequent handling and transport of the spray dried powder (e.g., to avoid clumping).

The particle size and moisture content of the spray dried powdered polymer (and accordingly the bulk density of the powder) is a complex function of the air feed rate and temperature, liquid feed rate and temperature, liquid droplet size and the solids concentration of the feed liquid. The spray-dried powder can have a moisture content of less than about 10 wt %, less than about 8 wt %, less than about 6 wt %, less than about 4 wt %, less than about 3 wt %, less than about 2 wt %, or less than about 1 wt %. Usually, the moisture (or liquid) content of the spray-dried powder is less than 6 wt %.

The particle size distribution, moisture (or liquid) content, and bulk density of the spray dried resin is controlled by operations well known in the spray drying art by variables such as feed resin solids content of the aqueous mixture, surface tension, speed of the rotary atomizer, feed rate of the aqueous resin, and the temperature differences between the inlet and outlet (atomization gas temperature). Particle size distribution may be an important factor in production of a powdered polymer. The powdered polymer can have a particle size ranging from about 0.1 µm to about 100µ. For example, the particle size of the powdered polymer can range from a low of about 1 µm, about 5 µm, about 10 µm, or about 20 µm to a high of about 45 µm, about 60 µm, about 70 µm, or about 80 µm. In another example, about 80 wt % to about 90 wt % of the powdered polymer can have a particle size of less than about 100 µm, less than about 85 µm, or less than about 75 µm. In another example, about 60 wt % to about 70 wt % of the powdered polymer can have a particle size of less than about 60 µm, less than about 50 µm, or less than about 45 µm.

If a desired particle size is not produced directly by the technique used to produce the powdered polymer, additional mechanical grinding can be employed to reduce the distribution of the particle sizes further.

Preparing the binder composition can include mixing, blending, or otherwise combining the powdered polymer into the aqueous polymer. In another example, the binder composition can be prepared by mixing, blending, or otherwise combining the aqueous polymer into the powdered polymer. The blending or mixing procedure can be carried out at ambient temperature or at a temperature greater than ambient temperature, for example about 50° C. The binder composition can be used immediately or stored for a period of time and may be diluted with water to a concentration suitable for the desired method of application, such as by a curtain coater onto the glass fibers. If stored for a period of time, the binder composition can be continuously or periodically agitated or stirred.

The powdered polymer and the aqueous polymer can be combined in any desired amount with respect to one another. In one or more embodiments, the amount of the powdered polymer in the binder composition can range from about 0.1 wt % to about 99 wt %, based on the combined weight of the powdered polymer and the weight of the solids in the aqueous polymer. For example, the binder composition can have a concentration of the powdered polymer in an amount ranging from a low of about 0.5 wt %, about 1 wt %, about 2 wt %, about 3 wt %, or about 4 wt % to a high of about 10 wt %, about 20 wt %, about 30 wt %, about 40 wt %, about 50 wt %, about 60 wt %, about 70 wt %, about 80 wt %, or about 90 wt %, based on the combined weight of the powdered polymer and the weight of solids in the aqueous polymer. In another example, the binder composition can have a concentration of the powdered polymer in an amount ranging from about 1 wt % to about 10 wt %, about 3 wt % to about 25 wt %, about 0.5 wt % to about 45 wt %, or about 2 wt % to about 35 wt %, based on the combined weight of the powdered polymer and the weight of the solids in the aqueous polymer. The solids content of the aqueous polymer can be measured by determining the weight loss upon heating a small sample, e.g., 1-5 grams, of the aqueous polymer at a temperature and time sufficient to remove the liquid. By measuring the weight of the sample before and after heating, the percent solids in the sample can be directly calculated or otherwise estimated.

In one or more embodiments, the amount of the powdered polymer in the binder composition can range from about 0.1 wt % to about 99 wt %, based on the amount of solids in the aqueous polymer. In another example, the binder composition can have a concentration of the powdered polymer ranging from a low of about 0.5 wt %, about 1 wt %, about 2 wt %, about 3 wt %, or about 4 wt % to a high of about 10 wt %, about 20 wt %, about 30 wt %, about 40 wt %, about 50 wt %, about 60 wt %, about 70 wt %, about 80 wt %, or about 90 wt %, based on the amount of solids in the aqueous polymer. In another example, the binder composition can have a concentration of the powdered polymer in an amount ranging from about 1 wt % to about 10 wt %, about 3 wt % to about 25 wt %, about 0.5 wt % to about 45 wt %, or about 2 wt % to about 35 wt %, based on the amount of solids in the aqueous polymer.

In one or more embodiments, the binder composition can have a total concentration of solids, i.e. the combination of the powdered polymer and the solids in the aqueous polymer, ranging from about 0.1 wt % to about 90 wt %, based on a combined weight of the aqueous polymer and the powdered polymer. For example, the binder composition can have a concentration of solids ranging from a low of about 0.1 wt %, about 1 wt %, about 5 wt %, or about 10 wt % to a high of about 20 wt %, about 30 wt %, about 40 wt %, about 50 wt %, or about 60 wt %, based on the combined weight of the aqueous polymer and the powdered polymer. In another example, the binder composition can have a concentration of solids ranging from about 1 wt % to about 45 wt %, about 5 wt % to about 40 wt %, about 10 wt % to about 35 wt %, about 5 wt % to about 30 wt %, or about 15 wt % to about 30 wt %, based on the combined weight of the aqueous polymer and the powdered polymer.

The binder composition can have a pH of about 5 or more, about 7 or more, or about 9 or more. For example, the pH of the binder composition can range from about 7 to about 11 or from about 8 to about 10 or from about 7 to about 9 or from about 7 to about 12. In order to increase the pH of the binder composition one or more bases or "base compounds" can be added. A preferred base compound for this purpose can be or include ammonia. Other suitable base compounds can include amines, e.g., primary, secondary, and tertiary amines and polyamines, sodium hydroxide (NaOH), potassium hydroxide (KOH), and other basic compounds. Furthermore, the addition of, for example, a secondary alkanolamine, a tertiary alkanolamine, and mixtures thereof can also serve as a source of polyols for participating in cross-linking reactions that cause the binder composition to cure. The addition of, for example, one or more polyamines can also increase the cross-linking reactions. Illustrative polyamines can include diethylenetriamine (DETA), triethylenetetramine (TETA), tetraethylenepentamine (TEPA), and any combination thereof.

In applying the binder composition to a fiberglass substrate, the aqueous polymer can act as a carrier for the powdered polymer. In other words, the aqueous polymer can transport or otherwise carry the powdered polymer to fiber junctions to provide a more effective curing process of a fiberglass product.

Fiberglass mats can be manufactured in a wet-laid or dry-laid process. In a wet-laid process, chopped bundles of fibers, having suitable length and diameter, can be introduced to an aqueous dispersant medium to produce an aqueous fiber slurry, known in the art as "white water." The white water can typically contain about 0.5 wt % fibers. The fibers can have a diameter ranging from about 0.5 μm to about 30 μm and a length ranging from about 5 mm to about 50 mm, for example. The fibers can be sized or unsized and wet or dry, as long as the fibers can be suitably dispersed within the aqueous fiber slurry.

In making non-woven fiber products, a fiber slurry, diluted or undiluted, can be introduced to a mat-forming machine that can include a mat forming screen, e.g. a wire screen or sheet of fabric, which can form a fiber product and can allow excess water to drain therefrom, thereby forming a wet or damp fiber mat. The fibers can be collected on the screen in the form of a wet fiber mat and excess water is removed by gravity and/or by vacuum assist. The removal of excess water via vacuum assist can include one or a series of vacuums.

The binder composition can be applied to the non-woven mat (or other fiberglass substrate), such as by a curtain coating, spraying, or dipping, onto fibers, such as glass fibers. Excess binder composition can be removed, for example under vacuum. Binder compositions containing anywhere from about 1 wt % to about 99 wt % solids can be used for making fiberglass products. For example, binder compositions containing somewhere between about 1 wt % and about 50 wt % solids can be used for making fiberglass products, including glass fiber products. For example, the binder composition can have a solids concentration ranging from about 5 wt % to about 45 wt %, about 10 wt % to about 40 wt %, or from about 15 wt % to about 35 wt %, based on the total weight of the binder composition. In another example, the binder composition can have a solids concentration ranging from a low of about 10 wt %, about 13 wt %, about 15 wt %, or about 18 wt % to a high of about 22 wt %, about 26 wt %, about 30 wt %, or about 33 wt %, based on the total weight of the binder composition.

The binder composition can be blended with other additives or ingredients commonly used in binder compositions for preparing fiber products and diluted with additional water to a desired concentration which is readily applied onto the fibers, such as by a curtain coater. Illustrative additives can include, but are not limited to, dispersants, biocides, viscosity modifiers, pH adjusters, coupling agents, surfactants, lubricants, defoamers, and the like. For example, the binder composition can be added to an aqueous solution (white water) of polyacrylamide (PAA), amine oxide (AO), or hydroxyethylcellulose (HEC). In another example, a coupling agent (e.g., a silane coupling agent, such as an organo silicon oil) can also be added to the solution. In another example, a coupling agent can be incorporated in a coating on the fibers.

A dispersing agent can be added to the binder composition in an amount ranging from about 10 ppm to about 8,000 ppm, about 100 ppm to about 5,000 ppm, or from about 200 ppm to about 1,000 ppm. The introduction of one or more viscosity modifiers can reduce settling time of the fibers and can improve the dispersion of the fibers in the aqueous solution. The amount of viscosity modifier used can be effective to provide the viscosity needed to suspend the fibers in the white water as needed to form the wet laid fiber product. The optional viscosity modifier(s) can be introduced in an amount ranging from a low of about 1 centipoise (cP), about 1.5 cP, or about 2 cP to a high of about 8 cP, about 12 cP, or about 15 cP. For example, optional viscosity modifier(s) can be introduced in an amount ranging from about 1 cP to about 12 cP, about 2 cP to about 10 cP, or about 2 cP to about 6 cP. In one or more embodiments, the fiber slurry can include of from about 0.03 wt % to about 25 wt % solids. The fiber slurry can be agitated to produce a uniform dispersion of fibers having a suitable consistency.

The amount of binder composition applied to the fiberglass product, e.g. a fiberglass mat product, can vary considerably. Loadings typically can range from about 3 wt % to about 45 wt %, about 10 wt % to about 40 wt %, or from about 15 wt % to about 30 wt %, of nonvolatile binder composition based on the dry weight of the bonded fiberglass product. For inorganic fibrous mats, the amount of binder composition applied to a fiberglass product can normally be confirmed by measuring the percent loss on ignition (LOI) of the fiber mat product.

Once the binder composition has been applied to a fiberglass substrate, the binder composition can be at least partially cured or fully cured. The binder composition can exhibit a multi-stage curing profile. For example, the binder composition containing the aqueous polymer and the powdered polymer can exhibit a two-stage cure profile. In other words, the aqueous polymer and the powdered polymer can cure at different times with respect to one another. For example, the aqueous polymer can cure before the powdered polymer. In another example, the powdered polymer can cure before the aqueous polymer.

The fiberglass product can be heated to effect final drying and at least partial curing. The duration and temperature of heating can affect the rate of processability and handleability, degree of curing and property development of the treated substrate. The curing temperature can be within the range of from about 50° C. to about 300° C., preferably within the range of from about 90° C. to about 230° C. and the curing time will usually be somewhere between 1 second to about 15 minutes. In one or more embodiments, the curing temperature can include a temperature gradient ranging from a low of about 25° C. to a high of about 280° C., i.e. the temperature applied during the curing process can vary. In at least one specific embodiment, the curing temperature can range from about 190° C. to about 260° C. and the curing time can range from a low of about 1 second, about 2 seconds, or about 3 seconds to a high of about 9 seconds, about 12 seconds, about 15 seconds, about 20 seconds, about 25 seconds, or about 30 seconds.

On heating, water (or other liquid) present in the binder composition evaporates, and the composition undergoes curing. These processes can take place in succession or simultaneously. Curing in the present context is to be understood as meaning the chemical alteration of the composition, for example crosslinking through formation of covalent bonds between the various constituents of the composition, especially the esterification reaction between pendant carboxyl (—COOH) of modified polymer and the hydroxyl (—OH) moieties both of the modified polymer and any added polyol(s), the formation of ionic interactions and clusters, and formation of hydrogen bonds.

Alternatively or in addition to heating the fiberglass product catalytic curing can be used to cure the fiberglass product. Catalytic curing of the fiberglass product can include the addition of an acid catalyst. Illustrative acid catalysts can include, but are not limited to, ammonium chloride or p-toluenesulfonic acid.

In one or more embodiments, the two-stage curing of the binder composition can be further enhanced or improved by combining a powdered polymer with an aqueous polymer, where the two polymers (powdered and liquid) are different. Different polymers can require different curing conditions that can increase the difference between the at least partially curing of the two polymers. For example, different polymers can have different curing times and/or require different temperatures and/or pressures in order to cure. As such, one of the polymers (powdered or liquid) can be at least partially cured, substantially cured, or even completely cured and then the other polymer (powdered or liquid) can then be at least partially cured, substantially cured, or completely cured.

In one or more embodiments, the drying and curing of the binder composition can be conducted in two or more distinct steps. For example, the fiberglass product can be first heated to a temperature and for a time sufficient to substantially dry but not to substantially cure the binder composition and then heated for a second time at a higher temperature and/or for a longer period of time to effect curing (cross-linking to a thermoset structure). Such a preliminary procedure, referred to as "B-staging", can be used to provide a binder-treated product, for example, in roll form, which may at a later stage be fully cured, with or without forming or molding into a particular configuration, concurrent with the curing process. This makes it possible, for example, to use fiberglass products which can be molded and cured elsewhere.

In one or more embodiments above or elsewhere herein, the binder composition can be cured or crosslinked via an esterification reaction between pendant carboxyl groups of the polymers and when optional polyl(s) is added both pendant hydroxyl groups of the polymers and hydroxyl groups of the polyol(s). Additional crosslinking may occur with any additional polyol that may optionally be added to the composition. A thermal process or heat can also be used to cure the binder composition. For example, an oven or other heating device can be used to at least partially cure the binder composition. Other additives for augmenting the cross-linking of the binder composition can be introduced thereto. For example, urea and polyamino compounds, both synthetic and natural (e.g., protein sources such as soy) can be introduced to the binder composition for augmenting the cross-linking.

As used herein, the terms "curing," "cured," and similar terms are intended to embrace the structural and/or morphological change that occurs in a the binder composition, such as by covalent chemical reaction (crosslinking), ionic interaction or clustering, improved adhesion to the substrate, phase transformation or inversion, and/or hydrogen bonding when the binder composition is dried and heated to cause the properties of a flexible, porous substrate, such as a mat or blanket of fibers, especially glass fibers, to which an effective amount of the binder composition has been applied, to be altered.

As used herein, the term "cured binder" refers to the cured product of the mixture of the aqueous polymer and the powdered polymer, such that the cured product bonds the fibers of a fibrous product together. Generally, the bonding occurs at the intersection of overlapping fibers.

As used herein, the terms "fiber," "fibrous," "fiberglass," "fiber glass," "glass fibers," and the like are refer to materials that have an elongated morphology exhibiting an aspect ratio (length to thickness) of greater than 100, generally greater than 500, and often greater than 1000. Indeed, an aspect ratio of over 10,000 is possible. Suitable fibers can be glass fibers, natural fibers, synthetic fibers, mineral fibers, ceramic fibers, metal fibers, carbon fibers, or any combination thereof. Illustrative glass fibers can include, but are not limited to, A-type glass fibers, C-type glass fibers, E-type glass fibers, S-type glass fibers, ECR-type glass fibers, wool glass fibers, and any combination thereof. The term "natural fibers," as used herein refers to plant fibers extracted from any part of a plant, including, but not limited to, the stem, seeds, leaves, roots, or phloem. Illustrative natural fibers can include, but are not limited to, cotton, jute, bamboo, ramie, bagasse, hemp, coir, linen, kenaf, sisal, flax, henequen, and any combination thereof. Illustrative synthetic fibers can include, but are not limited to, synthetic polymers, such as polyester, polyamide, aramid, and any combination thereof. In at least one specific embodiment, the fibers can be glass fibers that are wet use chopped strand glass fibers (WUCS). Wet use chopped strand glass fibers can be formed by conventional processes known in the art. The WUCS can have a moisture content ranging from a low of about 5%, about 8%, or about 10% to a high of about 20%, about 25%, or about 30%.

Prior to using the fibers to make a fiberglass product, the fibers can be allowed to age for a period of time. For example, the fibers can be aged for a period of a few hours to several weeks before being used to make a fiberglass product. For fiberglass mat products the fibers can typically be aged for about 3 to about 30 days. Ageing the fibers includes simply storing the fibers at room temperature for the desired amount of time prior to being used in making a fiberglass product.

In one or more embodiments, a method for binding loosely associated, non-woven mat or blanket of fibers can include, but is not limited to (1) contacting the fibers with the binder composition and (2) heating the binder composition to an elevated temperature, which temperature is sufficient to at least partially cure the binder composition. Preferably, the binder composition is cured at a temperature ranging from about 75° C. to about 300° C., usually at a temperature between about 100° C. and up to a temperature of about 250° C. The binder composition can be cured at an elevated temperature for a time ranging from about 1 second to about 15 minutes. The particular curing time can depend, at least in part, on the type of oven or other heating device design and/or production or line speed.

In one or more embodiments, a method for preparing a two phase binder composition can include, but is not limited to, mixing, blending, or otherwise combining a powdered binder with an aqueous binder. The method can also include contacting a fiberglass substrate with the two phase binder composition. The method can also include at least partially curing the two phase binder composition to produce a fiberglass product.

Depending on formation conditions, the density of the product can be varied from a relatively fluffy low density product to a higher density of about 6 to about 10 pounds per cubic foot or higher. In one or more embodiments, the fiber mat product can have a basis weight ranging from a low of about 0.1 pound, about 0.5 pounds, or about 0.8 pounds to a high of about 3 pounds, about 4 pounds, or about 5 pounds per 100 square feet. For example, the fiber mat product can have a basis weight of from about 0.6 pounds per 100 square feet to about 2.8 pounds per 100 square feet, about 1 pound per 100 square feet to about 2.5 pounds per 100 square feet, or about 1.5 pounds per 100 square feet to about 2.2 pounds per 100 square feet. In at least one specific embodiment, the fiber mat product can have a basis weight of about 1.2 pounds per 100 square feet, about 1.8 pounds per 100 square feet, or about 2.4 pounds per 100 square feet.

The fibers can represent the principal material of the non-woven fiber products, such as a fiberglass mat product. For example, 60 wt % to about 90 wt % of the fiberglass product, based on the combined amount of binder and fibers can be composed of the fibers. The binder composition can be applied in an amount such that the cured binder constitutes from about 1 wt % to about 40 wt % of the finished glass fiber product. The binder composition can be applied in an amount such that the cured binder constitutes a low of from about 1 wt %, about 5 wt %, or about 10 wt % to a high of about 15 wt %, about 20 wt %, or about 25 wt %, based on the combined weight of the binder and the fibers.

Fiberglass products may be used by themselves or incorporated into a variety of products. For example, fiberglass products can be used as or incorporated into insulation batts or rolls, composite flooring, asphalt roofing shingles, siding, gypsum wall board, roving, microglass-based substrate for printed circuit boards, battery separators, filter stock, tape stock, carpet backing, air filters, and as reinforcement scrim in cementitious and non-cementitious coatings for masonry.

The fiberglass mat product can have a thickness ranging from a low of about 0.25 mm (10 mils), about 0.63 mm (25 mils), about 0.76 mm (30 mils), about 1.3 mm (50 mils), or about 1.9 mm (75 mils) to a high of about 6.4 mm (250 mils), about 12.7 mm (500 mils), about 19 mm (750 mils), or about 25.4 mm (1,000 mils). For example, the fiberglass mat product can have a thickness of about 0.5 mm (20 mils), about 1 mm (39 mils) about, or about 2 mm (79 mils). In another example, the fiberglass mat product can have a thickness of from about 0.5 mm (20 mils) to about 1.3 mm (50 mils), about 0.6 mm (25 mils) to about 1.1 mm (45 mils), or about 0.8 mm (30 mils) to about 1 mm (40 mils).

In one or more embodiments, fiberglass mats containing one or more of the binder compositions disclosed herein can have an average dry tensile strength of at least 25 lbs/3 inch, at least 50 lbs/3 inch, at least 75 lbs/3 inch, at least 100 lbs/3 inch; at least 150 lbs/3 inch, at least 200 lbs/3 inch, at least 250 lbs/3 inch, at least 300 lbs/3 inch, at least 350 lbs/3 inch, at least 370 lbs/3 inch, at least 380 lbs/3 inch, at least 390 lbs/3 inch, at least 400 lbs/3 inch, at least 410 lbs/3 inch, at least 420 lbs/3 inch, at least 430 lbs/3 inch, at least 440 lbs/3 inch, at least 450, lbs/3 inch, at least 460 lbs/3 inch, at least 470 lbs/3 inch, at least 480 lbs/3 inch, at least 490 lbs/3 inch, at least 500 lbs/3 inch, at least 510, or at least 520 lbs/3 inch.

In one or more embodiments, fiberglass mats containing one or more of the binder compositions disclosed herein can have an average tear strength of about 275 grams force (gf), about 300 gf, about 325 gf, about 350 gf, about 375 gf, about 400 gf, about 425 gf, 450 gf, about 475 gf, about 500 gf, about 525 gf, about 550 gf, about 575 gf, about 600 gf, about 625 gf, about 650 gf, about 675 gf, about 700 gf, about 725 gf, about 750 gf, about 775 gf, about 800 gf, about 825 gf, about 850 gf, about 875 gf, about 900 gf, about 925 gf, about 950 gf, about 975 gf, or about 1,000 gf. In one or more embodiments, fiberglass mats containing one or more of the binder compositions disclosed herein can have an average tear strength of at least 500 gf, at least 600 gf, at least 700 gf, at least 750 gf, at least 800 gf, at least 850 gf, at least 900 gf, at least 925 gf, at least 950 gf, at least 975 gf, or at least 1,000. In one or more embodiments, fiberglass mats containing one or more of the binder compositions disclosed herein can have an average tear strength ranging from a low of about 500 gf, about 525 gf, about 550 gf, or about 575 gf to a high of about 700 gf, about 750 gf, about 800 gf, about 820 gf, about 840 gf, about 860 gf, about 880 gf, about 900 gf, about 920 gf, about 940 gf, or about 960 gf.

In one or more embodiments, the fiberglass mats can have a basis weight (BW) ranging from a low of about 1.5 lbs/100 ft², about 1.6 lbs/100 ft², about 1.7 lbs/100 ft², or about 1.8 lbs/100 ft² to a high of about 2 lbs/100 ft², about 2.1 lbs/100 ft², about 2.2 lbs/100 ft², or about 2.3 lbs/100 ft². For example, the fiberglass mats can have a basis weight of about 1.65 lbs/100 ft², about 1.75 lbs/100 ft², about 1.85 lbs/100 ft², about 1.95 lbs/100 ft², or about 2.1 lbs/100 ft².

In one or more embodiments, the fiberglass mats can have a percent of hot-wet retention (% HW) of greater than about 40%, about 45%, about 50%, about 55%, about 60%, about 65%, about 70%, or about 75%. For example, the fiberglass mats can have a percent of hot-wet retention (% HW) greater than about 57%, greater than about 59%, greater than about 63%, greater than about 67%, greater than about 69%, or greater than about 71%.

EXAMPLES

To provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

Example I

One comparative example (CE1) and two inventive examples (EX. 1 and 2) were prepared. The binder used in comparative example (CE1) was an aqueous styrene maleic anhydride (SMA) modified urea-formaldehyde polymer. The SMA modified urea-formaldehyde polymer was prepared by mixing SMA with urea-formaldehyde at a weight ratio of about 0.1:1 at ambient conditions. Examples 1 and 2 used the same SMA modified urea-formaldehyde polymer as in the comparative example CE1. Examples 1 and 2 also included a powdered SMA modified urea-formaldehyde polymer used in the comparative example (CE1). The powdered SMA modified urea-formaldehyde polymer was prepared by spray drying. The binder used in Example 1 was a mixture of the aqueous urea-formaldehyde liquid and 1 wt % of the powdered SMA modified urea-formaldehyde polymer, based on the weight of solids in the aqueous SMA modified urea-formaldehyde polymer. The binder used in Example 2 was a mixture of the aqueous urea-formaldehyde polymer and 5 wt % of the powdered SMA modified urea-formaldehyde polymer, based on the weight of solids in the aqueous urea-formaldehyde polymer.

For all examples, namely CE1, and EX. 1 and 2, a handsheet study was performed for each sample. Dilutions were made to approximately 18 wt % solids with AO white water. AO white water is an aqueous solution of amine oxide. The handsheets were cured at a temperature of about 260° C. for 20 seconds. Three handsheets for each example (CE1, Ex. 1 and Ex. 2) were prepared. The handsheets were 10.5 in.×10.5 in. The thickness of the handsheets prior to curing, i.e. while wet, were not measured. The thickness of the handsheets after curing was about 35 mils. The glass fibers for Example I had an average length of about 1.25 inches. Each set was tested for dry and wet tensile strength on a Thwing-Albert tensile tester (0-200 kg load cell) and Elmendorf tear strength on a Thwing-Albert Pro Tear (1600 g pendulum). The results of the handsheet studies are shown in Table 1.

TABLE 1

| | Avg Dry Tensile, lbs/3 inch | BW, lbs/100 ft² | Avg. Tear, gf | % LOI | $DT_N$ | % HW |
|---|---|---|---|---|---|---|
| CE1 | 451 | 1.84 | 796 | 20.8 | 11.8 | 69.4 |
| EX. 1 | 453 | 1.85 | 842 | 20.8 | 11.8 | 59.7 |
| EX. 2 | 412 | 1.84 | 947 | 20.7 | 10.8 | 59.2 |

Percent loss of ignition (% LOI) was determined by weighing samples after 30 minutes at 650° C. Percent hot-wet retention (% HW) is the amount of dry tensile strength retained after immersing the sample in an 80° C. water bath for 10 minutes. Replications for each test were made and standard deviations for each example were calculated. The average tear strength values shown in Table 1 are the average of 9 measurements, i.e. the average of three tests performed on each handsheet. The dry tensile number ($DT_N$) values shown in Table 1 is the average of 6 measurements, i.e. the average of two tests performed on each handsheet. The percent loss of ignition (LOI) and Basis Weight (BW) shown in Table 1 is the average of 3 measurements, i.e. the average of one test performed on each handsheet.

Referring to Table 1, the comparative example (CE1) had a hot-wet retention rate (% HW) of about 69%, while Examples 1 and 2 had a hot-wet retention rate of about 59%. As shown in Table 1, the average dry tensile strength for Examples 1 was statistically equal to the comparative example (CE1) and the average dry tensile strength for Example 2 was statistically less than the comparative example (CE1).

Considering the average tear strength, as the concentration of the powdered SMA modified urea-formaldehyde polymer increased from 1 wt % (Ex. 1) to 5 wt % (Ex. 2), an increase in the tear strength was observed as compared to the comparative example (CE1). For example, the tear strength for Ex. 2, which had 5 wt % of the powdered SMA modified urea-formaldehyde polymer was 947 gf, which was an increase of about 151 gf or about 19%, as compared to the comparative example CE1.

Due to the variation in basis weight (BW), loss of ignition (LOI), and hot-wet retention (HW), the dry tensile number ($DT_N$) was calculated for each binder composition. The $DT_N$ was determined from the following equation: basis weight $$DT_N = \frac{\text{dry tensile strength}}{(LOI * \text{basis weight})}$$

When $DT_N$ was calculated, Example 1 was the same as the comparative example (CE1) and Example 2 was lower. Specifically, Examples 1 and 2 had $DT_N$ values of 11.8 and 10.8, respectively; while the comparative example (CE1) had a $DT_N$ value 11.8.

Example II

Three comparative examples (CE2-4) and twelve inventive examples (EX. 3-14) were prepared and are summarized below in Table 2. The aqueous SMA modified urea-formaldehyde polymer and the powdered SMA modified urea-formaldehyde polymer used in Example I were further studied by further varying the amount of the powdered polymer added to the aqueous polymer and by varying the cure time.

For all examples, namely CE2-4, and EX. 3-14, a handsheet study was performed for each sample. The handsheet study was conducted as discussed in Example I, except the dilutions were made to approximately 13 wt % solids with AO white water and depending on the particular example, the curing time varied from 15 seconds to 30 seconds. The results of the handsheet study are also summarized in Table 2.

TABLE 2

|  | wt % Powdered Polymer | Curing Time, 260° C. | Avg Dry Tensile, N/3 inch | BW, lbs/100 ft² | Avg. Tear, gf | % LOI | DT$_N$ | % HW |
|---|---|---|---|---|---|---|---|---|
| CE2 | 0 | 15 | 126.2 | 1.8 | 484 | 20.3 | 3.48 | 56.1 |
| CE3 | 0 | 20 | 111.4 | 1.8 | 576 | 20.3 | 3.00 | 63.0 |
| CE4 | 0 | 30 | 113.9 | 1.8 | 575 | 19.6 | 3.18 | 67.0 |
| EX. 3 | 0.5 | 15 | 127.9 | 1.8 | 582 | 20.0 | 3.50 | 56.5 |
| EX. 4 | 0.5 | 20 | 114.3 | 1.8 | 553 | 19.2 | 3.28 | 62.6 |
| EX. 5 | 0.5 | 30 | 112.5 | 1.8 | 590 | 20.4 | 3.01 | 64.6 |
| EX. 6 | 1 | 15 | 113.4 | 1.9 | 495 | 21.2 | 2.89 | 72.0 |
| EX. 7 | 1 | 20 | 108.8 | 1.8 | 564 | 19.4 | 3.08 | 65.6 |
| EX. 8 | 1 | 30 | 108.6 | 1.8 | 580 | 19.5 | 3.07 | 65.8 |
| EX. 9 | 3 | 15 | 102.1 | 1.8 | 612 | 19.8 | 2.86 | 70.2 |
| EX. 10 | 3 | 20 | 106.0 | 1.8 | 675 | 20.3 | 2.91 | 59.7 |
| EX. 11 | 3 | 30 | 105.6 | 1.8 | 676 | 20.8 | 2.84 | 70.7 |
| EX. 12 | 6 | 15 | 113.5 | 1.8 | 589 | 19.5 | 3.22 | 53.8 |
| EX. 13 | 6 | 20 | 103.0 | 1.8 | 574 | 19.6 | 2.92 | 67.0 |
| EX. 14 | 6 | 30 | 104.0 | 1.8 | 647 | 19.5 | 2.98 | 64.3 |

Overall, the data appears to show a slight decrease in the average, dry tensile strength (Newtons (N) per 3 inch) as the level of powdered polymer increased. This decrease also appears to be apparent in looking at the DT$_N$.

The average tear strength (gf), however, increased as the level of powdered polymer increased. For example, inventive example EX. 14 exhibited an average tear strength of about 647 gf, while the comparative example CE4 only exhibited an average tear strength of about 575 gf. Similarly, inventive examples EX. 10 and 11 each exhibited average tear strengths of about 675 gf and about 676 gf, respectively, while the comparative examples CE3 and CE4 only exhibited about 576 gf and about 575 gf, respectively.

Accordingly, the data in Table 2 shows that as the level of the powdered polymer is increased from 0.5 wt % to 6 wt %, the glass mat tensile strengths slightly decreased, but the average tear strength substantially increased.

Example III

One comparative example (CE5) and three inventive examples (EX. 15-17) were prepared and are summarized below in Table 3. The aqueous binder used for examples CE5 and EX. 15-17 was an unmodified aqueous urea-formaldehyde polymer. The unmodified aqueous urea-formaldehyde polymer used in examples CE5 and Ex. 15-17 was made by standard techniques for making urea-formaldehyde polymers, such as those discussed and described in U.S. Pat. No. 5,362,842. Inventive examples 15 and 16 also included the same powdered SMA modified urea-formaldehyde polymer used in Examples I and II. Inventive examples 17 also included a powdered styrene maleic anhydride (SMA) polymer. The powdered SMA polymer was prepared by spray drying an aqueous solution of SMA polymer containing about 40 wt % solids.

For all examples, namely CE5 and EX. 15-17, a handsheet study was performed for each sample. The handsheet study was conducted as discussed in Example I, except the dilutions were made to approximately 13 wt % solids with polyacrylamide (PAA) white water, and were cured at about 205° C. for 70 seconds. The dilutions also included about 0.25 wt % of NALCON® dispersant. The results of the handsheet study are also summarized in Table 3.

TABLE 3

|  | wt % Powdered Polymer | Avg Dry Tensile, lbs/3 inch | BW, lbs/100 ft² | Avg. Tear, gf | % LOI | DT$_N$ | % HW |
|---|---|---|---|---|---|---|---|
| CE5 | 0 | 151.3 | 1.8 | 476 | 20.7 | 4.07 | 61.5 |
| EX. 15 | 1 | 140.1 | 1.8 | 563 | 20.0 | 3.89 | 69.7 |
| EX. 16 | 3 | 132.4 | 1.8 | 548 | 20.0 | 3.68 | 71.6 |
| EX. 17 | 1.21 | 150.6 | 1.8 | 510 | 20.6 | 4.05 | 71.8 |

All of the inventive examples (EX. 15-17) exhibited a greater hot-wet retention relative to the comparative example CE5.

The addition of the powdered polymers to the binder composition produced glass mats with similar tensile strengths as compared to the comparative example CE5. The average tear strength for the glass mats, however, increased for all inventive examples (EX. 15-17) relative to the comparative example CE5.

Embodiments of the present disclosure further relate to any one or more of the following paragraphs:

1. A fiberglass product, comprising a plurality of fibers and a two phase binder composition comprising a mixture of an aqueous polymer and a powdered polymer.

2. The fiberglass product according to paragraph 1, wherein the aqueous polymer comprises an aldehyde based polymer, a mixture of Maillard reactants, a copolymer of one or more vinyl aromatic derived units and at least one of maleic anhydride and maleic acid, a polyamide-epichlorhydrin polymer, or any combination thereof, and wherein the powdered polymer comprises an aldehyde based polymer, a Maillard reaction product, a copolymer of one or more vinyl aromatic derived units and at least one of maleic anhydride and maleic acid, a polyamide-epichlorhydrin polymer, or any combination thereof.

3. The fiberglass product according to paragraph 2, wherein the aldehyde based polymer comprises a urea-formaldehyde polymer, a phenol-formaldehyde polymer, a melamine-formaldehyde polymer, a resorcinol-formaldehyde polymer, or any combination thereof.

4. The fiberglass product according to paragraph 2, wherein the mixture of Maillard reactants comprises at least one polycarboxylic acid, at least one of ammonia and an amine, and at least one carbohydrate source.

5. The fiberglass product according to any one of paragraphs 1 to 4, wherein the mixture has a concentration of solids ranging from about 10 wt % to about 35 wt %, based on the combined weight of the aqueous polymer and the powdered polymer.

6. The fiberglass product according to any one of paragraphs 1 to 5, wherein the concentration of the powdered polymer in the mixture ranges from about 0.1 wt % to about 40 wt %, based on the amount of solids in the aqueous polymer.

7. The fiberglass product according to any one of paragraphs 1 to 6, wherein the aqueous polymer is combined with an extender to from a premix, and wherein the premix is combined with the powdered polymer to produce the mixture.

8. The fiberglass product according to any one of paragraphs 1 to 7, wherein the aqueous polymer and the powdered polymer are different polymers.

9. The fiberglass product according to any one of paragraphs 1 to 8, wherein the aqueous polymer and the powdered polymer are the same.

10. The fiberglass product according to any one of paragraphs 1 to 9, wherein the powdered polymer is prepared by spray drying an aqueous polymer.

11. The fiberglass product according to any one of paragraphs 1 to 10, wherein the plurality of fibers have a length of from about 3 mm to about 50 mm and a diameter of from about 5 µm to about 40 µm.

12. A method for preparing a fiberglass product, comprising contacting a plurality of fibers with a two phase binder composition, the binder composition comprising a mixture of an aqueous polymer and a powdered polymer; collecting the contacted fibers to form a non-woven mat; and heating the non-woven mat to at least partially cure the binder composition.

13. The method according to paragraph 12, wherein the aqueous polymer comprises an aldehyde based polymer, a mixture of Maillard reactants, a copolymer of one or more vinyl aromatic derived units and at least one of maleic anhydride and maleic acid, a polyamide-epichlorhydrin polymer, or any combination thereof, and wherein the powdered polymer comprises an aldehyde based polymer, a Maillard reaction product, a copolymer of one or more vinyl aromatic derived units and at least one of maleic anhydride and maleic acid, a polyamide-epichlorhydrin polymer, or any combination thereof.

14. The method according to paragraph 13, wherein the aldehyde based polymer comprises a urea-formaldehyde polymer, a phenol-formaldehyde polymer, a melamine-formaldehyde polymer, a resorcinol-formaldehyde polymer, or any combination thereof.

15. The method according to paragraph 13, wherein the mixture of Maillard reactants comprises at least one polycarboxylic acid, at least one of ammonia and an amine, and at least one carbohydrate source.

16. The method according to any one of paragraphs 12 to 15, wherein the mixture has a concentration of solids ranging from about 10 wt % to about 35 wt %, based on the combined weight of the aqueous polymer and the powdered polymer.

17. The method according to any one of paragraphs 12 to 16, wherein the concentration of the powdered polymer in the mixture ranges from about 0.1 wt % to about 40 wt %, based on the amount of solids in the aqueous polymer.

18. The method according to any one of paragraphs 12 to 17, wherein the aqueous polymer is combined with an extender to from a premix, and wherein the premix is combined with the powdered polymer to produce the mixture.

19. The method according to any one of paragraphs 12 to 18, wherein the aqueous polymer and the powdered polymer are different polymers.

20. The method according to any one of paragraphs 12 to 19, wherein the aqueous polymer and the powdered polymer are the same.

21. The method according to any one of paragraphs 12 to 20, wherein the powdered polymer is prepared by spray drying an aqueous polymer.

22. The method according to any one of paragraphs 12 to 21, wherein the aqueous polymer at least partially cures before the powdered polymer at least partially cures.

23. The method according to any one of paragraphs 12 to 22, wherein the aqueous polymer at least partially cures after the powdered polymer at least partially cures.

24. The process according to any one of paragraphs 12 to 23, wherein heating the non-woven mat comprises heating the non-woven mat to a temperature of about 150° C. to about 300° C. for a time ranging from about 5 seconds to about 90 seconds.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for preparing a fiberglass product, comprising:
contacting a plurality of fibers with a two phase binder composition, the binder composition comprising a mixture of a liquid phase aqueous polymer and a solid phase powdered polymer, wherein:
the powdered polymer is dispersed or suspended in the aqueous polymer,
the aqueous polymer comprises (1) a first aldehyde based polymer, (2) a mixture of Maillard reactants, (3) a first copolymer of one or more vinyl aromatics and at least one of maleic anhydride and maleic acid, (4) a first polyamide-epichlorohydrin polymer, or (5) any combination thereof,
the powdered polymer comprises a second aldehyde based polymer,
wherein the powdered polymer is prepared by spray drying an aqueous second aldehyde based polymer,
the second aldehyde based polymer comprises a urea-formaldehyde polymer, a phenol-formaldehyde polymer, a melamine-formaldehyde polymer, a resorcinol-formaldehyde polymer, or any combination thereof, and the concentration of the powdered polymer in the mixture ranges from about 0.1 wt % to about 40 wt %, based on the solids content of the aqueous polymer;

collecting the contacted fibers to form a non-woven mat; and heating the non-woven mat to at least partially cure the binder composition.

2. The method of claim 1, wherein the aqueous polymer comprises the first aldehyde based polymer, and wherein the first aldehyde based polymer comprises a urea-formaldehyde polymer, a phenol-formaldehyde polymer, a melamine-formaldehyde polymer, a resorcinol-formaldehyde polymer, or any combination thereof.

3. The method of claim 1, wherein the aqueous polymer comprises the mixture of Maillard reactants, and wherein the mixture of Maillard reactants comprises at least one polycarboxylic acid, at least one of ammonia and an amine, and at least one carbohydrate source.

4. The method of claim 1, wherein the mixture has a concentration of solids ranging from about 10 wt % to about 35 wt %, based on the combined weight of the aqueous polymer and the powdered polymer.

5. The method of claim 1, wherein the concentration of the powdered polymer in the mixture ranges from about 0.1 wt % to about 10 wt %, based on the solids content of the aqueous polymer.

6. The method of claim 1, wherein the aqueous polymer is combined with an extender to form a premix, and wherein the premix is combined with the powdered polymer to produce the mixture.

7. The method of claim 1, wherein the powdered polymer further comprises a Maillard reaction product.

8. The method of claim 1, wherein the aqueous polymer comprises the first copolymer of one or more vinyl aromatics and at least one of maleic anhydride and maleic acid.

9. The method of claim 1, wherein heating the non-woven mat cures the aqueous polymer before the powdered polymer such that the aqueous polymer and the powdered polymer are cured at different times with respect to one another.

10. The method of claim 1, wherein heating the non-woven mat cures the powdered polymer before the aqueous polymer such that the powdered polymer and the aqueous polymer are cured at different times with respect to one another.

11. The method of claim 1, wherein heating the non-woven mat comprises heating the non-woven mat to a temperature of about 150° C. to about 300° C. for a time ranging from about 5 seconds to about 90 seconds.

12. The method of claim 11, wherein the powdered polymer further comprises a second copolymer of one or more vinyl aromatics and at least one of maleic anhydride and maleic acid.

13. A method for preparing a fiberglass product, comprising:

contacting a plurality of fibers with a two phase binder composition, the binder composition comprising a mixture of a liquid phase aqueous polymer and a solid phase powdered polymer, wherein:

the powdered polymer is dispersed or suspended in the aqueous polymer, the aqueous polymer comprises a first polyamide-epichlorohydrin polymer, the powdered polymer comprises (1) an aldehyde based polymer, (2) a Maillard reaction product, (3) a copolymer of one or more vinyl aromatics and at least one of maleic anhydride and maleic acid, (4) a second polyamide-epichlorohydrin polymer, or (5) any combination thereof, and the concentration of the powdered polymer in the mixture ranges from about 0.1 wt % to about 40 wt %, based on the solids content of the aqueous polymer;

collecting the contacted fibers to form a non-woven mat; and heating the non-woven mat to at least partially cure the binder composition.

14. A method for preparing a fiberglass product, comprising:

contacting a plurality of fibers with a two phase binder composition, the binder composition comprising a mixture of a liquid phase aqueous polymer and a solid phase powdered polymer, wherein:

the powdered polymer is dispersed or suspended in the aqueous polymer, the aqueous polymer comprises (1) an aldehyde based polymer, (2) a mixture of Maillard reactants, (3) a copolymer of one or more vinyl aromatics and at least one of maleic anhydride and maleic acid, (4) a first polyamide-epichlorohydrin polymer, or (5) any combination thereof, the powdered polymer comprises a second polyamide-epichlorohydrin polymer, and the concentration of the powdered polymer in the mixture ranges from about 0.1 wt % to about 40 wt %, based on the solids content of the aqueous polymer;

collecting the contacted fibers to form a non-woven mat; and heating the non-woven mat to at least partially cure the binder composition.

15. The method of claim 1, wherein the aqueous polymer comprises the first aldehyde based polymer.

16. A method for preparing a fiberglass product, comprising:

contacting a plurality of fibers with a two phase binder composition, the binder composition comprising a mixture of a liquid phase aqueous polymer and a solid phase powdered polymer, wherein:

the powdered polymer is dispersed or suspended in the aqueous polymer, the aqueous polymer comprises an aqueous styrene maleic anhydride modified urea-formaldehyde polymer, the powdered polymer comprises a spray dried styrene maleic anhydride modified urea-formaldehyde polymer, and the concentration of the powdered polymer in the mixture ranges from about 0.1 wt % to about 40 wt %, based on the solids content of the aqueous polymer;

collecting the contacted fibers to form a non-woven mat; and heating the non-woven mat to at least partially cure the binder composition.

17. A method for making a fiberglass product, comprising:

contacting a plurality of fibers with a two phase binder composition comprising a mixture of a liquid phase aqueous polymer and a solid phase powdered polymer, wherein:

the powdered polymer is dispersed or suspended in the aqueous polymer, the aqueous polymer comprises a first aldehyde based polymer, the powdered polymer comprises a second aldehyde based polymer, the powdered polymer is prepared by spray drying an aqueous second aldehyde based polymer, and the binder composition comprises about 0.1 wt % to about 40 wt % of the powdered polymer, based on the solids content of the aqueous polymer; and heating the contacted fibers to at least partially cure the binder composition, wherein the aqueous polymer further comprises a first copolymer of one or more vinyl aromatics and at least one of maleic anhydride and maleic acid and the powdered polymer further comprises a second copolymer of one or more vinyl aromatics and at least one of maleic anhydride and maleic acid.

18. The method of claim 17, wherein the aqueous polymer further comprises a mixture of Maillard reactants and the powdered polymer further comprises a Maillard reaction product.

19. A method for making a fiberglass product, comprising:

contacting a plurality of fibers with a two phase binder composition comprising a mixture of a liquid phase aqueous polymer and a solid phase powdered polymer, wherein:

the powdered polymer is dispersed or suspended in the aqueous polymer, the aqueous polymer comprises a first polyamide-epichlorohydrin polymer, the powdered polymer comprises a second polyamide-epichlorohydrin polymer, and the binder composition comprises about 0.1 wt % to about 40 wt % of the powdered polymer, based on the solids content of the aqueous polymer; and heating the contacted fibers to at least partially cure the binder composition.

\* \* \* \* \*